US012725513B2

(12) United States Patent
Karc et al.

(10) Patent No.: US 12,725,513 B2
(45) **Date of Patent: *Sep. 1, 2026**

(54) CONTROL DEVICE FOR USE WITH A THREE-WAY LAMP SOCKET

(71) Applicant: Lutron Technology Company LLC, Coopersburg, PA (US)

(72) Inventors: Jeffrey Karc, Danielsville, PA (US); Galen Edgar Knode, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/489,091

(22) Filed: Oct. 18, 2023

(65) Prior Publication Data

US 2024/0049377 A1 Feb. 8, 2024

Related U.S. Application Data

(63) Continuation of application No. 17/030,547, filed on Sep. 24, 2020, now Pat. No. 11,825,581, which is a (Continued)

(51) Int. Cl.
*H05B 47/195* (2020.01)
*G08C 17/02* (2006.01)

(52) U.S. Cl.
CPC ............ *G08C 17/02* (2013.01); *H05B 47/195* (2020.01)

(58) Field of Classification Search
CPC .... H05B 47/10; H05B 47/105; H05B 47/175; H05B 47/19
See application file for complete search history.

(56) References Cited

U.S. PATENT DOCUMENTS 3,701,870 A 10/1972 Sorenson
4,365,237 A 12/1982 Knight
(Continued)

FOREIGN PATENT DOCUMENTS

EP 1524750 A2 4/2005
WO WO9729560 8/1997
WO WO2004077188 9/2004

OTHER PUBLICATIONS

Machine Translation of EP1524750A2 (Year: 2005).
(Continued)

*Primary Examiner* — Jason M Crawford
(74) *Attorney, Agent, or Firm* — Michael S. Czarnecki; Glen R. Farbanish; Philip N. Smith

(57) ABSTRACT

A control device may be configured to be installed in a three-way screw-in socket that includes multi-position switches. The control device may be configured to control one or more lighting loads in response to the respective positions of the multi-position switches of the three-way screw-in socket. The lighting loads may include a lighting load that is integral with the control device, a lighting load that is installed in a threaded receptacle of the control device, and/or one or more lighting loads controlled by respective devices that are associated with the control device. The control device may include a wireless communication circuit that is configured to transmit messages in response to operation of the multi-position switches into respective positions. The control device may be configured to control the lighting loads in response to messages received at the wireless communication circuit.

12 Claims, 8 Drawing Sheets

Related U.S. Application Data continuation of application No. 14/571,412, filed on Dec. 16, 2014, now Pat. No. 10,806,010.

(60) Provisional application No. 61/920,826, filed on Dec. 26, 2013.

(56) References Cited

U.S. PATENT DOCUMENTS

| | | | | |
|---|---|---|---|---|
| 4,378,525 | A | 3/1983 | Burdick | |
| 4,498,650 | A | 2/1985 | Smith et al. | |
| 4,563,592 | A | 1/1986 | Yuhasz et al. | |
| 4,630,248 | A | 12/1986 | Scott | |
| 4,889,999 | A | 12/1989 | Rowen | |
| 4,972,457 | A | 11/1990 | O'Sullivan | |
| 4,989,260 | A | 1/1991 | Meade | |
| 5,109,200 | A | 4/1992 | Dushane et al. | |
| 5,239,205 | A | 8/1993 | Hoffman et al. | |
| 5,340,954 | A | 8/1994 | Hoffman et al. | |
| 5,457,442 | A | 10/1995 | Lucero | |
| 5,458,311 | A | 10/1995 | Holbrook | |
| 5,736,965 | A * | 4/1998 | Mosebrook | H01Q 1/007 343/702 |
| 5,818,128 | A | 10/1998 | Hoffman et al. | |
| 5,831,395 | A | 11/1998 | Mortimer et al. | |
| 5,895,985 | A | 4/1999 | Fischer | |
| 5,905,442 | A | 5/1999 | Mosebrook et al. | |
| 6,072,284 | A | 6/2000 | Lin | |
| 6,211,626 | B1 | 4/2001 | Lys et al. | |
| 6,320,506 | B1 * | 11/2001 | Ferraro | G08B 15/00 340/568.1 |
| 6,369,704 | B2 | 4/2002 | Hilleary | |
| 6,380,852 | B1 | 4/2002 | Hartman et al. | |
| 6,400,968 | B1 * | 6/2002 | White | G08C 23/04 455/574 |
| 6,528,954 | B1 | 3/2003 | Lys et al. | |
| RE38,069 | E | 4/2003 | Posa | |
| 6,546,873 | B1 | 4/2003 | Andrejkovic et al. | |
| 6,650,322 | B2 | 11/2003 | Dai et al. | |
| 6,710,553 | B2 * | 3/2004 | Logan | H05B 47/17 315/56 |
| 6,803,728 | B2 | 10/2004 | Balasubramaniam et al. | |
| 6,912,429 | B1 | 6/2005 | Bilger | |
| 7,198,523 | B2 | 4/2007 | Adams et al. | |
| 7,237,069 | B2 | 6/2007 | Carr et al. | |
| 7,298,833 | B2 | 11/2007 | Klein et al. | |
| 7,311,558 | B2 | 12/2007 | Adams et al. | |
| 7,375,445 | B1 | 5/2008 | Smith | |
| 7,411,489 | B1 | 8/2008 | Elwell et al. | |
| 7,423,413 | B2 | 9/2008 | Dobbins et al. | |
| 7,511,628 | B2 | 3/2009 | Salvestrini | |
| 7,573,208 | B2 | 8/2009 | Newman, Jr. | |
| 7,687,940 | B2 | 3/2010 | Mosebrook et al. | |
| 7,772,724 | B2 | 8/2010 | Mosebrook et al. | |
| 7,778,734 | B2 | 8/2010 | Oswald et al. | |
| 7,800,319 | B2 | 9/2010 | Raneri | |
| 7,847,440 | B2 | 12/2010 | Mosebrook et al. | |
| 7,872,423 | B2 * | 1/2011 | Biery | H05B 39/08 315/149 |
| 7,906,916 | B2 | 3/2011 | Gehman | |
| 8,008,866 | B2 | 8/2011 | Newman, Jr. et al. | |
| 8,009,042 | B2 | 8/2011 | Steiner et al. | |
| 8,049,427 | B2 | 11/2011 | Altonen et al. | |
| 8,153,918 | B2 | 4/2012 | Agronin et al. | |
| 8,183,783 | B1 | 5/2012 | Jonsson | |
| 8,199,010 | B2 | 6/2012 | Sloan et al. | |
| 8,212,424 | B2 | 7/2012 | Mosebrook et al. | |
| 8,212,425 | B2 | 7/2012 | Mosebrook et al. | |
| 8,228,184 | B2 | 7/2012 | Blakeley et al. | |
| 8,255,090 | B2 | 8/2012 | Frader-Thompson et al. | |
| 8,258,654 | B2 | 9/2012 | Parsons | |
| 8,330,638 | B2 | 12/2012 | Altonen et al. | |
| 8,410,706 | B2 | 4/2013 | Steiner et al. | |
| 8,451,116 | B2 | 5/2013 | Steiner et al. | |
| 8,471,779 | B2 | 6/2013 | Mosebrook | |
| 8,639,391 | B1 | 1/2014 | Alberth, Jr. et al. | |
| 8,723,447 | B2 | 5/2014 | Steiner | |
| 8,760,293 | B2 | 6/2014 | Steiner | |
| 8,853,950 | B1 * | 10/2014 | Chang | H05B 47/17 315/307 |
| 9,054,465 | B2 | 6/2015 | Hodges | |
| 9,167,669 | B2 | 10/2015 | Karc et al. | |
| 9,208,965 | B2 | 12/2015 | Busby et al. | |
| 9,210,760 | B2 | 12/2015 | Sanders et al. | |
| 9,252,595 | B2 | 2/2016 | Recker et al. | |
| 9,337,663 | B2 | 5/2016 | Recker et al. | |
| 9,374,424 | B2 | 6/2016 | Cheong et al. | |
| 9,538,619 | B2 | 1/2017 | Raneri et al. | |
| 9,553,451 | B2 | 1/2017 | Zacharchuk et al. | |
| 9,699,871 | B2 | 7/2017 | Karc et al. | |
| 9,702,514 | B1 | 7/2017 | Colby | |
| 9,736,914 | B2 | 8/2017 | Pakkala et al. | |
| 9,826,604 | B2 | 11/2017 | Karc et al. | |
| 9,848,479 | B2 | 12/2017 | Karc et al. | |
| 9,874,332 | B1 * | 1/2018 | Colby | F21V 29/59 |
| 10,143,071 | B2 | 11/2018 | Karc et al. | |
| 10,314,148 | B2 | 6/2019 | Karc et al. | |
| 10,317,923 | B2 | 6/2019 | Karc et al. | |
| 10,531,546 | B1 | 1/2020 | Recker et al. | |
| 10,687,409 | B2 | 6/2020 | Karc et al. | |
| 10,806,010 | B2 * | 10/2020 | Karc | G08C 17/02 |
| 10,932,347 | B2 | 2/2021 | Pennycooke et al. | |
| 11,825,581 | B2 * | 11/2023 | Karc | G08C 17/02 |
| 2002/0000911 | A1 | 1/2002 | Hilleary | |
| 2002/0047646 | A1 | 4/2002 | Lys et al. | |
| 2002/0105285 | A1 | 8/2002 | Loughrey | |
| 2002/0180367 | A1 * | 12/2002 | Logan | H05B 47/17 315/119 |
| 2003/0011538 | A1 | 1/2003 | Lys et al. | |
| 2003/0199247 | A1 * | 10/2003 | Striemer | H04B 7/155 455/11.1 |
| 2004/0133314 | A1 | 7/2004 | Ehlers et al. | |
| 2004/0155609 | A1 | 8/2004 | Lys et al. | |
| 2005/0030192 | A1 | 2/2005 | Weaver et al. | |
| 2005/0162282 | A1 | 7/2005 | Dresti et al. | |
| 2005/0164630 | A1 * | 7/2005 | Kates | G08B 25/10 455/10 |
| 2006/0028997 | A1 | 2/2006 | McFarland | |
| 2006/0072726 | A1 | 4/2006 | Klein et al. | |
| 2007/0007826 | A1 * | 1/2007 | Mosebrook | H05B 47/165 307/139 |
| 2007/0007898 | A1 | 1/2007 | Bruning | |
| 2007/0043477 | A1 | 2/2007 | Ehlers et al. | |
| 2007/0045431 | A1 | 3/2007 | Chapman et al. | |
| 2007/0061050 | A1 | 3/2007 | Hoffknecht | |
| 2007/0146126 | A1 | 6/2007 | Wang | |
| 2007/0188025 | A1 * | 8/2007 | Keagy | H05B 47/10 307/115 |
| 2007/0217211 | A1 | 9/2007 | Hewson | |
| 2007/0233323 | A1 | 10/2007 | Wiemeyer et al. | |
| 2007/0241615 | A1 | 10/2007 | Goodrich | |
| 2007/0250189 | A1 | 10/2007 | Rourke et al. | |
| 2008/0024074 | A1 * | 1/2008 | Mosebrook | H05B 39/08 315/291 |
| 2008/0024674 | A1 | 1/2008 | Park | |
| 2008/0083234 | A1 | 4/2008 | Krebs et al. | |
| 2008/0094189 | A1 | 4/2008 | Kates | |
| 2008/0120578 | A1 | 5/2008 | Wang et al. | |
| 2008/0183316 | A1 | 7/2008 | Clayton | |
| 2008/0258563 | A1 | 10/2008 | Hodges | |
| 2008/0281472 | A1 | 11/2008 | Podgorny et al. | |
| 2008/0283621 | A1 | 11/2008 | Quirino et al. | |
| 2008/0316047 | A1 | 12/2008 | De Goederen -Oei et al. | |
| 2009/0039854 | A1 | 2/2009 | Blakeley | |
| 2009/0052859 | A1 | 2/2009 | Greenberger et al. | |
| 2009/0093234 | A1 | 4/2009 | Cai et al. | |
| 2009/0108765 | A1 | 4/2009 | Weightman | |
| 2009/0141522 | A1 | 6/2009 | Adest et al. | |
| 2009/0192927 | A1 | 7/2009 | Berg et al. | |
| 2009/0195192 | A1 | 8/2009 | Joseph | |
| 2009/0195349 | A1 | 8/2009 | Frader-Thompson et al. | |
| 2009/0196016 | A1 | 8/2009 | Massara et al. | |

(56) References Cited

U.S. PATENT DOCUMENTS

| | | | | |
|---|---|---|---|---|
| 2009/0206769 | A1* | 8/2009 | Biery | H05B 39/08 315/158 |
| 2009/0206983 | A1 | 8/2009 | Knode et al. | |
| 2009/0284169 | A1 | 11/2009 | Valois | |
| 2009/0299504 | A1 | 12/2009 | Kumazawa et al. | |
| 2010/0026479 | A1 | 2/2010 | Tran | |
| 2010/0052894 | A1 | 3/2010 | Steiner et al. | |
| 2010/0076615 | A1 | 3/2010 | Daniel et al. | |
| 2010/0141153 | A1 | 6/2010 | Recker et al. | |
| 2010/0148983 | A1 | 6/2010 | Huxley et al. | |
| 2010/0161706 | A1 | 6/2010 | Kim et al. | |
| 2010/0164299 | A1 | 7/2010 | Lee et al. | |
| 2010/0171430 | A1 | 7/2010 | Seydoux | |
| 2010/0176661 | A1 | 7/2010 | Wilson | |
| 2010/0188229 | A1 | 7/2010 | Nhep | |
| 2010/0207759 | A1 | 8/2010 | Sloan et al. | |
| 2010/0244706 | A1 | 9/2010 | Steiner et al. | |
| 2010/0244709 | A1 | 9/2010 | Steiner et al. | |
| 2010/0256823 | A1 | 10/2010 | Cherukuri et al. | |
| 2010/0270982 | A1 | 10/2010 | Hausman, Jr. et al. | |
| 2010/0280667 | A1 | 11/2010 | Steinberg | |
| 2010/0289430 | A1 | 11/2010 | Stelzer et al. | |
| 2010/0327766 | A1 | 12/2010 | Recker et al. | |
| 2011/0012433 | A1* | 1/2011 | Parsons | H05B 47/19 315/159 |
| 2011/0031806 | A1 | 2/2011 | Altonen et al. | |
| 2011/0083948 | A1 | 4/2011 | Mahle | |
| 2011/0095687 | A1 | 4/2011 | Jonsson | |
| 2011/0121654 | A1 | 5/2011 | Recker et al. | |
| 2011/0162946 | A1 | 7/2011 | Altonen | |
| 2011/0163600 | A1 | 7/2011 | Garb et al. | |
| 2011/0267802 | A1 | 11/2011 | Petrillo | |
| 2011/0279300 | A1 | 11/2011 | Mosebrook | |
| 2011/0313560 | A1 | 12/2011 | Hangaard et al. | |
| 2012/0001488 | A1 | 1/2012 | Puschnigg et al. | |
| 2012/0026726 | A1 | 2/2012 | Recker et al. | |
| 2012/0043889 | A1 | 2/2012 | Recker et al. | |
| 2012/0049800 | A1 | 3/2012 | Johnson et al. | |
| 2012/0066168 | A1 | 3/2012 | Fadell et al. | |
| 2012/0080944 | A1 | 4/2012 | Recker et al. | |
| 2012/0086272 | A1 | 4/2012 | Chen et al. | |
| 2012/0091213 | A1 | 4/2012 | Altonen et al. | |
| 2012/0112666 | A1 | 5/2012 | Bennette | |
| 2012/0139446 | A1 | 6/2012 | Koren et al. | |
| 2012/0146513 | A1 | 6/2012 | Radermacher | |
| 2012/0146538 | A1 | 6/2012 | Nerone | |
| 2012/0278640 | A1 | 11/2012 | Caglianone | |
| 2012/0286676 | A1 | 11/2012 | Saveri, III et al. | |
| 2012/0286689 | A1 | 11/2012 | Newman, Jr. et al. | |
| 2012/0286940 | A1 | 11/2012 | Carmen, Jr. et al. | |
| 2012/0293153 | A1 | 11/2012 | Garb et al. | |
| 2012/0313535 | A1 | 12/2012 | Bedell et al. | |
| 2013/0013091 | A1 | 1/2013 | Cavalcanti et al. | |
| 2013/0030589 | A1 | 1/2013 | Pessina et al. | |
| 2013/0030732 | A1 | 1/2013 | Shetty et al. | |
| 2013/0214609 | A1 | 8/2013 | Carmen, Jr. | |
| 2013/0234625 | A1 | 9/2013 | Kondo et al. | |
| 2013/0282067 | A1 | 10/2013 | Van Hulle et al. | |
| 2013/0293149 | A1 | 11/2013 | Stockburger et al. | |
| 2013/0334973 | A1 | 12/2013 | Wagenaar Cacciola | |
| 2014/0015423 | A1 | 1/2014 | Williams | |
| 2014/0042920 | A1* | 2/2014 | Chou | H05B 45/20 315/192 |
| 2014/0049164 | A1* | 2/2014 | McGuire | H05B 45/20 315/307 |
| 2014/0049963 | A1 | 2/2014 | McGuire et al. | |
| 2014/0081474 | A1 | 3/2014 | Blakeley et al. | |
| 2014/0117871 | A1* | 5/2014 | Swatsky | H01H 3/02 315/246 |
| 2014/0125150 | A1 | 5/2014 | Alberth et al. | |
| 2014/0142724 | A1 | 5/2014 | Park et al. | |
| 2014/0148923 | A1 | 5/2014 | Yamada et al. | |
| 2014/0152187 | A1 | 6/2014 | Lin et al. | |
| 2014/0169362 | A1 | 6/2014 | Folkmanis et al. | |
| 2014/0180486 | A1 | 6/2014 | Newman, Jr. et al. | |
| 2014/0191573 | A1 | 7/2014 | Chen et al. | |
| 2014/0244040 | A1 | 8/2014 | Alberth, Jr. et al. | |
| 2014/0252962 | A1* | 9/2014 | Chen | H05B 47/105 315/155 |
| 2014/0265577 | A1 | 9/2014 | Beckman | |
| 2014/0265880 | A1 | 9/2014 | Taipale et al. | |
| 2014/0265881 | A1 | 9/2014 | Karc et al. | |
| 2014/0265918 | A1 | 9/2014 | Cummings | |
| 2014/0327369 | A1 | 11/2014 | Wendt | |
| 2014/0353135 | A1 | 12/2014 | Erdmann et al. | |
| 2015/0005900 | A1 | 1/2015 | Steele et al. | |
| 2015/0054341 | A1 | 2/2015 | Holder et al. | |
| 2015/0054410 | A1 | 2/2015 | Sanders et al. | |
| 2015/0061497 | A1 | 3/2015 | Martins et al. | |
| 2015/0088287 | A1 | 3/2015 | Nagamatsu et al. | |
| 2015/0130276 | A1 | 5/2015 | McNeill-McCallum et al. | |
| 2015/0137692 | A1 | 5/2015 | Newman, Jr. et al. | |
| 2015/0145428 | A1 | 5/2015 | Gergely et al. | |
| 2015/0145501 | A1 | 5/2015 | Ware | |
| 2015/0185751 | A1* | 7/2015 | Karc | G05F 1/66 700/295 |
| 2015/0189721 | A1* | 7/2015 | Karc | G08C 17/02 315/246 |
| 2015/0189725 | A1 | 7/2015 | Karc et al. | |
| 2015/0249337 | A1 | 9/2015 | Spira et al. | |
| 2015/0305125 | A1* | 10/2015 | Chen | H02J 7/02 315/155 |
| 2015/0366039 | A1* | 12/2015 | Noori | F21V 23/0435 315/307 |
| 2015/0382437 | A1* | 12/2015 | Karc | H02J 13/00 315/307 |
| 2016/0041573 | A1 | 2/2016 | Chen et al. | |
| 2016/0065004 | A1 | 3/2016 | Hartman et al. | |
| 2016/0192458 | A1 | 6/2016 | Keith | |
| 2016/0198553 | A1* | 7/2016 | Fathollahi | H05B 47/1965 439/236 |
| 2016/0205745 | A1 | 7/2016 | Saveri, III et al. | |
| 2016/0286612 | A1 | 9/2016 | Vos et al. | |
| 2016/0290616 | A1 | 10/2016 | Pantaleo | |
| 2017/0085070 | A1 | 3/2017 | AbuGhazaleh | |
| 2017/0194789 | A1 | 7/2017 | Chen et al. | |
| 2018/0014392 | A1 | 1/2018 | Charlton et al. | |
| 2018/0035518 | A1* | 2/2018 | Cook | H04L 12/2816 |
| 2018/0035520 | A1 | 2/2018 | Karc et al. | |
| 2018/0070430 | A1* | 3/2018 | Edwards | G08C 17/02 |
| 2018/0110114 | A1 | 4/2018 | Karc et al. | |
| 2018/0188706 | A1* | 7/2018 | Wootton | H02J 13/14 |
| 2019/0098735 | A1 | 3/2019 | Karc et al. | |
| 2019/0394861 | A1 | 12/2019 | Karc et al. | |
| 2020/0033902 | A1 | 1/2020 | Karc et al. | |
| 2020/0323074 | A1* | 10/2020 | Huang | H05B 47/19 |
| 2020/0352004 | A1 | 11/2020 | Chu | |
| 2024/0049377 | A1* | 2/2024 | Karc | G08C 17/02 |
| 2024/0155751 | A1* | 5/2024 | Baker | H05B 45/31 |
| 2025/0168958 | A1* | 5/2025 | Karc | H02J 13/00 |

OTHER PUBLICATIONS

Farivar, Cyrus, "Shake, Rattle and Roll: How We Got a Washing Machine to Text When it's Done", Available at http://arstechnica.com/information-technology/2012/11/shake-rattle-and-roll-how-we-got-a-washing-machine-to-text-when-its-done/?comments=1, Nov. 25, 2012, pp. 1-12.

International Search Report and Written Opinion, International Application No. PCT/US16/20708; International Filing date May 3, 2016; date of mailing May 17, 2016.

"Where to find a remote power outlet switched on/off by another outlet?" Web blog Post. Ask Meta Filter. 1999-2017 MetaFilter Network Inc. Jan. 20, 2011 6:26 PM. http://ask.metafilter.com/176304/Where-to-find-a-remote-power-outlet-switched-onoff-by-anotheroutlet. Web Date Accessed Apr. 14, 2017.

Cree, "Cree Reinvents the Three-Way LED Bulb", Available at http://www.cree.com/News-and-Events/Cree-News/Press-Releases/2014/June/3way-bulb, Jun. 4, 2014, 1 page.

Hunterdouglas, "Introduction to the PlatinumTM RF Adapter", 2011, 2 pages.

(56) References Cited

OTHER PUBLICATIONS

Hunterdouglas, “Platinum Technology Accessories”, 2011, 4 pages.

* cited by examiner

CONTROL DEVICE FOR USE WITH A THREE-WAY LAMP SOCKET

CROSS-REFERENCE TO RELATED APPLICATIONS

This application is a continuation of U.S. patent application Ser. No. 17/030,547, filed Sep. 24, 2020; which is a continuation of U.S. patent application Ser. No. 14/571,412, filed Dec. 16, 2014, now U.S. Pat. No. 10,806,010, issued Oct. 13, 2020; both of which claim priority to U.S. Provisional Patent Application No. 61/920,826, filed Dec. 26, 2013, all of which are incorporated herein by reference in their entirety.

BACKGROUND

Electric lights, such as table lamps, floor lamps, etc., may be configured for three-way operation. Such a light may include a specialized socket, such as a three-way screw-in socket having two multi-position switches, for controlling light sources, such as incandescent bulbs, that are configured for three-way (or "tri-light") operation. Typically, a three-way incandescent light bulb may be controlled to three different illuminated intensities, as well as off, for example by rotating an adjustment knob that is operably coupled to the multi-position switches of the specialized socket.

FIG. 1 is a simplified diagram depicting an example prior art three-way light bulb 10 and an example prior art three-way socket 20. The three-way light bulb 10 comprises a first, lower power filament 12 and a second, higher-power filament 14 that are housed in a translucent or transparent housing 15, for example a bulbous glass enclosure. For example, the lower-power filament 12 may have a resistance of approximately 28852 and a rated power of approximately 50 W and the higher-power filament 14 may have a resistance of approximately 14452 and a rated power of approximately 100 W.

The three-way light bulb 10 further comprises a screw-in base 16 that is configured to be screwed into an Edison socket, such as the three-way socket 20, such that the three-way light bulb 10 may be coupled to an alternating current (AC) power source 30. As shown, the lower power filament 12 is coupled in series between a first tip portion 17 and a grooved portion 19 of the screw-in base 16. The second lower power filament 14 is coupled in series between a second tip portion 18 and the grooved portion 19 of the screw-in base 16.

The illustrated three-way socket 20 includes two multi-position switches having respective moveable, or common, contacts 22, 24 that may be controlled together, for example in response to rotations of an adjustment actuator that is operably coupled to the multi-position switches. The moveable contacts 22, 24 are coupled to the hot side of the AC power source 30. The screw-in base 16 of the three-way light bulb 10 may be configured such that, when the three-way light bulb 10 is installed in the three-way socket 20, the grooved portion 19 is placed in electrical communication with (e.g., is electrically connected to) the neutral side of the AC power source 30, and the first and second tip portions 17, 18 may be placed in electrical communication with respective fixed contacts of the multi-position switches of the three-way socket 20.

To illustrate, the three-way light bulb 10 may be rated for 50 W/100 W/150 W operation when installed in a three-way electric light, such as a lamp. When the moveable contacts 22, 24 are both in position A, both filaments 12, 14 of the three-way lamp 10 are disconnected from the AC power source 30 and the three-way light bulb 10 is off. When the moveable contacts 22, 24 are both in position B, the first movable contact 22 completes the circuit between the AC power source 30 and the first filament 12, such that the first filament is energized and the second filament 14 remains un-energized. Accordingly, the three-way light bulb 10 is illuminated to a first intensity, for example corresponding to a power rating of approximately 50 W when the moveable contacts 22, 24 are in position B. When the moveable contacts 22, 24 are both in position C, the second filament 14 is energized while the first filament 14 is un-energized, such that the three-way light bulb 10 is illuminated to a second intensity, for example corresponding to a power rating of approximately 100 W. When the moveable contacts 22, 24 are both in position D, both of the filaments 12, 14 are energized, such that the three-way light bulb 10 is illuminated to a third intensity, for example to a power rating of approximately 150 W.

Typical three-way light bulbs are constrained to generating light in accordance with the predetermined wattage ratings of the first and second filaments. Accordingly, the lighting levels achievable by a three-way electric light are typically limited by the type of three-way bulb that is installed in the light. Additionally, the three-way switching capability of known three-way electric lights is not capable of being leveraged in automated load control systems, such as lighting control systems.

SUMMARY

As described herein, a control device may be configured to be installed in a three-way screw-in socket that includes multi-position switches. The control device may be configured to control one or more electrical loads, such as lighting loads, in response to the respective positions of the multi-position switches of the three-way screw-in socket. The one or more lighting loads may include, for example, a lighting load that is integral with the control device, a lighting load that is installed in the control device, and/or one or more lighting loads that are controlled by respective devices that are associated with the control device.

The control device may be implemented, for example, as a controllable light source that includes an integral lighting load. The controllable light source may include a housing that encloses the lighting load. The controllable light source may include a screw-in base that is configured to electrically connect the controllable light source with a three-way screw-in socket in which the controllable light source is installed. The screw-in base may include electrical connection portions for receiving an AC line voltage of an AC power source that powers the three-way screw-in socket. The controllable light source may include a control circuit that is configured to detect whether the AC line voltage is present at the electrical connection portions. The control circuit may be configured to generate status information based on the presence of the AC line voltage at the electrical connection portions. The status information may correspond to present respective positions of the multi-position switches of the three-way screw-in socket.

The controllable light source may include a load regulation circuit that is configured to control an operational characteristic, such as light intensity, of the integral lighting load, in response to the respective positions of the multi-position switches of the three-way screw-in socket in which the controllable light source is installed. The respective positions of the multi-position switches may be associated with predetermined lighting presets, such that operation of the multi-position switches of the three-way screw-in socket from one position to another may cause the lighting load to be adjusted from one lighting preset to another.

The controllable light source may include a wireless communication circuit. The wireless communication circuit may transmit one or more messages, for instance via radio frequency (RF) signals, in response to operation of the multi-position switches of the three-way screw-in socket. The one or more messages may include, for example, the status information (e.g., corresponding to respective present positions of the multi-position switches), information related to a currently selected lighting preset, and/or or a command that is directed to one or more other devices that are associated with the controllable light source. A command included in such a message may, for example, cause respective lighting loads controlled by the one or more other devices to be synchronized with the integral lighting load.

In another example, the control device may be implemented as a three-way socket control device. The three-way socket control device may include a screw-in base that is configured to electrically connect the three-way socket control device with a three-way screw-in socket in which the controllable light source is installed. The screw-in base may include electrical connection portions for receiving an AC line voltage of an AC power source that powers the three-way screw-in socket. The three-way socket control device may include a control circuit that is configured to detect whether the AC line voltage is present at the electrical connection portions. The control circuit may be configured to generate status information based on the presence of the AC line voltage at the electrical connection portions. The status information may correspond to present respective positions of the multi-position switches of the three-way screw-in socket. The three-way socket control device may include a threaded receptacle that is electrically connected to the screw-in base. The threaded receptacle may be configured to receive a lighting load, such as a standard light bulb or a three-way bulb.

The three-way socket control device may include a load regulation circuit that is configured to control an operational characteristic, such as light intensity, of a lighting load that is installed in the threaded receptacle. For example, the load regulation circuit may control the installed lighting load in response to the respective positions of the multi-position switches of the three-way screw-in socket in which the three-way socket control device is installed. The respective positions of the multi-position switches may be associated with predetermined lighting presets, such that operation of the multi-position switches of the three-way screw-in socket from one position to another may cause the installed lighting load to be adjusted from one lighting preset to another.

The three-way socket control device may include a wireless communication circuit. The wireless communication circuit may transmit one or more messages, for instance via radio frequency (RF) signals, in response to operation of the multi-position switches of the three-way screw-in socket. The one or more messages may include, for example, the status information (e.g., corresponding to respective present positions of the multi-position switches), information related to a currently selected lighting preset, and/or or a command that is directed to one or more other devices that are associated with the three-way socket control device. A command included in such a message may, for example, cause respective lighting loads controlled by the one or more other devices to be synchronized with the installed lighting load.

DETAILED DESCRIPTION

Figure 2:
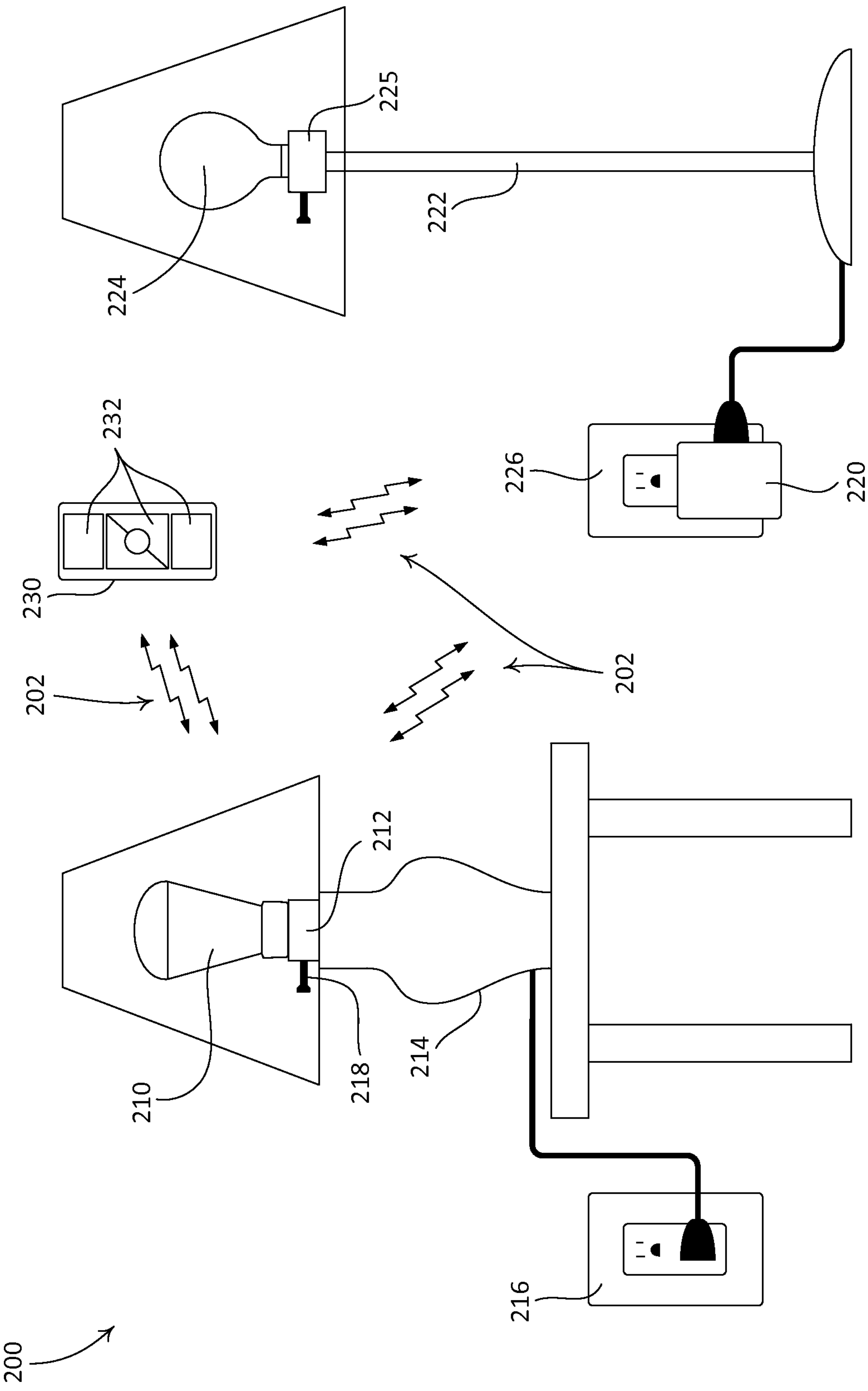
FIG. 2 depicts an example load control system having a controllable light source that is connected to a three-way socket of a table lamp.

FIG. 2 depicts an example load control system that is configured to as a lighting control system 200. The lighting control system 200 may include various components that are associated with each other, and that are configured to communicate with one another, for instance via wireless communication. The components of the lighting control system 200 may include, for example one or more load control devices, one or more electrical loads that are controlled via the one or more load control devices, one or more control devices (e.g., remote control devices) that are configured to control the load control devices, and/or one or more sensors that are configured to provide inputs (e.g., sensor readings) to the one or more load control devices.

As shown, the lighting control system 200 includes a controllable light source 210. The controllable light source 210 may be configured to be installed in a three-way screw-in socket, and may be referred to as a three-way socket control device, or more simply as a control device. The lighting control system 200 further includes a table lamp 214 that is configured for three-way operation. The table lamp 214 includes a three-way screw-in socket 212 that may be referred to as a three-way socket. The table lamp 214 may be plugged into an electrical outlet 216 for powering the controllable light source 210 from an alternating current (AC) power source (not shown). The controllable light source 210 is installed in the three-way screw-in socket 212, such that the controllable light source 210 is in electrical communication (e.g., is electrically connected to) with the AC power source. The three-way socket 212 may be configured similarly to the three-way socket 20 shown in FIG. 1, and may include an adjustment knob 218 for switching the multi-position switches of the three-way socket 212 between various positions.

The controllable light source 210 may comprise an integral lighting load, such as an incandescent bulb with multiple filaments, a light emitting diode (LED) light source, a compact fluorescent (CFL) lamp, or other suitable lighting load. The controllable light source 210 may be configured to adjust the intensity of the lighting load differently, depending upon a present position of the multi-position switches of the three-way socket 212, for example as described herein.

The controllable light source 210 may be configured to control an operational characteristic, such as an intensity, of the lighting load in accordance with one or more presets, for instance in response to the position of the multi-position switches of the three-way socket 212. For example, the controllable light source 210 may be configured to control the intensity of the lighting load to respective preset light intensities in response to rotation of the adjustment knob 218 of the three-way socket 212 (e.g., to 0%, 33%, 66%, and 100% light intensities). In addition, the controllable light source 210 may be configured to control one or more other operational characteristics of the lighting load in accordance with respective ones of the presets (e.g., a delay time, a fade rate, a color of the lighting load, or the like). For example, if the lighting load of the controllable light source 210 comprises a red green-blue (RGB) LED light engine, the controllable light source may be alternatively configured to adjust the color and/or the intensity of the lighting load in response to the position of the multi-position switches of the three-way socket 212.

The controllable light source 210 may be configured for wireless communication, for example via wireless signals, such as radio-frequency (RF) signals 202. The controllable light source 210 may be configured to transmit one or more messages, for example in response to rotation of the adjustment knob 218 of the three-way socket 212. The one or more messages may include, for instance, status information that corresponds to respective positions of the multi-position switches of the three-way socket 212, information related to a currently selected lighting preset, and/or one or more commands that are directed to one or more lighting control devices that are associated with the controllable light source 210.

The controllable light source 210 may be configured to communicate with one or more other devices (e.g., load control devices) that are associated with the controllable light source 210, for instance other lighting control devices of the lighting control system 200. As shown, for example, the lighting control system 200 includes a plug-in load control device 220, and a floor lamp 222 that is plugged into the plug-in load control device 220. The illustrated floor lamp 222 includes a standard Edison socket 225, and a standard light bulb 224 is installed in the socket 225.

The plug-in load control device 220 may be plugged into an AC power source, such as the electrical outlet 226. The plug-in load control device 220 may be operated to control an amount of power delivered to the bulb 224 from the AC power source. The plug-in load control device 220 may be configured for wireless communication, for example via RF signals 202, and may receive one or more messages transmitted by the controllable light source 210, for instance via RF signals 202. The plug-in load control device 220 may be configured to adjust the intensity of the light bulb 224 in response to one or more messages (e.g., including commands) that are received from the controllable light source 210. The one or more messages may include, for instance, a command to synchronize the intensity of the light bulb 224 with the intensity of the lighting load of the controllable light source 210. The one or more messages transmitted by the controllable light source 210 may include information related to the preset selected by the controllable light source 210 in response to the position of the multi-position switches of the three-way socket 212. The controllable light source 210 and the plug-in load control device 220 may be configured to control the respective lighting loads to different intensities in response to preset information included in the one or more messages.

The lighting control system 200 may further include a remote control device 230 that has a plurality of buttons 232. The remote control device 230 may be, for example, a battery-powered handheld remote control. Alternatively, the remote control device 230 may be mounted vertically to a wall, or supported on a pedestal that may be mounted on a tabletop. The remote control device 230 may comprise a microprocessor, an RF transmitter, and a battery for powering the microprocessor and the RF transmitter. The remote control device 230 may transmit RF signals 202 to the controllable light source 210 and/or to the plug-in load control device 220 for controlling the intensities of the respective lighting loads in response to actuations of one or more of the buttons 232. Examples of battery-powered remote control devices are described in greater detail in commonly assigned U.S. Pat. No. 7,573,208, issued Jul. 22, 2009, entitled "Method Of Programming A Lighting Preset From A Radio-Frequency Remote Control," and U.S. Pat. No. 8,330,638, issued Dec. 11, 2012, entitled "Wireless Battery Powered Remote Control Having Multiple Mounting Means," the entire disclosures of which are incorporated herein by reference.

The remote control device 230 may be configured to operate as a control-source device (e.g., an RF transmitter) and the plug-in load control device 220 may be configured to operate as a control-target device (e.g., an RF receiver), and the controllable light source 210 may be configured to operate as both a control-source device and a control-target device. Alternatively, each of the control devices of the lighting control system 200 may include an RF transceiver, such that the devices are able to transmit and receive RF signals 202. Examples of RF load control systems are described in commonly-assigned U.S. Pat. No. 5,905,442, issued on May 18, 1999, entitled "Method And Apparatus For Controlling And Determining The Status Of Electrical Devices From Remote Locations," and U.S. patent application Ser. No. 12/033,223, filed Feb. 19, 2008, entitled "Communication Protocol For A Radio Frequency Load Control System," the entire disclosures of which are incorporated herein by reference. In addition, the controllable light source 210 may alternatively include an RF transmitter or an RF receiver. The lighting control system 200 may further include one or more signal repeaters (not shown). Such signal repeaters may be configured to receive and retransmit one or more signals (e.g., RF signals 202) to one or more devices of the lighting control system 200. To illustrate, such a signal repeater may be configured to receive signals from the controllable light source 210, and to retransmit the signals to one or more other devices of the lighting control system 200, such as the plug-in load control device 220.

The lighting control system 200 may further include other types of control devices, such as remote occupancy or vacancy sensors (not shown) for detecting occupancy and vacancy conditions in a space in which the lighting control system 200 is installed. The occupancy or vacancy sensors may be configured to transmit messages to the controllable light source 210 and/or to the plug-in load control device 220, via RF signals 202, for example in response to detecting occupancy or vacancy conditions. Examples of RF load control systems having occupancy and vacancy sensors are described in greater detail in commonly assigned U.S. Pat. No. 8,009,042, issued Aug. 30, 2011 Sep. 3, 2008, entitled "Radio Frequency Lighting Control System With Occupancy Sensing," U.S. Pat. No. 8,199,010, issued Jun. 12, 2012, entitled "Method And Apparatus For Configuring A Wireless Sensor," and U.S. Pat. No. 8,228,184, issued Jul.

24, 2012, entitled "Battery Powered Occupancy Sensor," the entire disclosures of which are incorporated herein by reference.

The lighting control system 200 may further include one or more remote daylight sensors (not shown) that are configured to measure a total light intensity in a space in which the lighting control system 200 is installed. The one or more daylight sensors may be configured to transmit messages, for instance including respective measured light intensities, to the controllable light source 210 and/or to the plug-in load control device 220, via the RF signals 202, for controlling the intensities of respective lighting loads in response to the measured light intensity. Examples of RF load control systems having daylight sensors are described in greater detail in commonly assigned U.S. Pat. No. 8,410,706, issued Apr. 2, 2013, entitled "Method Of Calibrating A Daylight Sensor," and U.S. Pat. No. 8,451,116, issued May 28, 2013, entitled "Wireless Battery-Powered Daylight Sensor," the entire disclosures of which are incorporated herein by reference.

The lighting control system 200 may further include, independently or in any combination, one or more other types of input or control devices, such as, for example: radiometers; cloudy day sensors; temperature sensors; humidity sensors; pressure sensors; smoke detectors; carbon monoxide detectors; air-quality sensors; motion sensors; security sensors; proximity sensors; fixture sensors; partition sensors; keypads; kinetic or solar-powered remote controls; key fobs; cell phones; smart phones; tablets; personal digital assistants; personal computers; laptops; timeclocks; audio-visual controls; safety devices; power monitoring devices such as power meters, energy meters, utility submeters, or utility rate meters; central control transmitters; or residential, commercial, or industrial controllers.

The lighting control system 200 may further include, independently or in any combination, one or more other types of load control devices, such as, for example: a dimming ballast for driving a gas-discharge lamp; a light-emitting diode (LED) driver for driving an LED light source; a dimming circuit for controlling the intensity of a lighting load; an electronic switch, controllable circuit breaker, or other switching device for turning an appliance on and off; a controllable electrical receptacle or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

Figure 3:
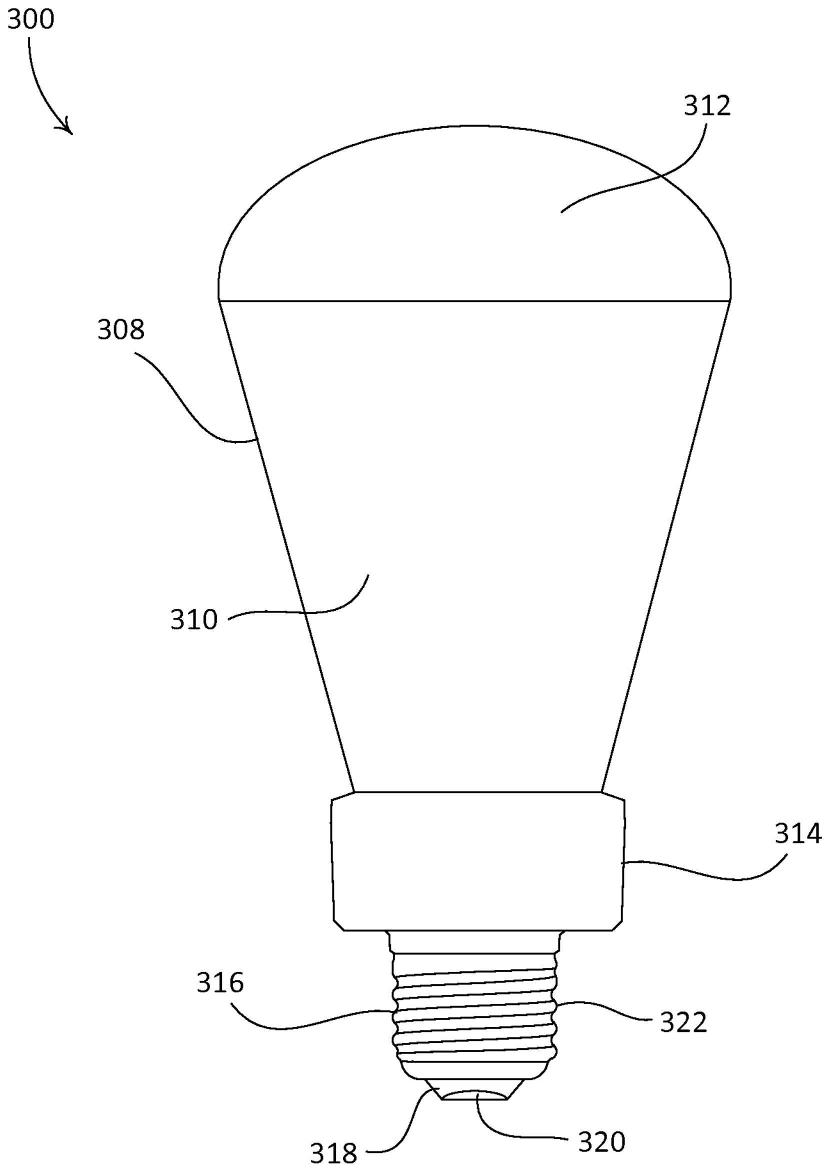
FIG. 3 depicts a side view of an example controllable light source.

FIG. 3 depicts an example controllable light source 300. The controllable light source 300 may be implemented, for example, as the controllable light source 210 of the lighting control system 200 shown in FIG. 2. As shown, the controllable light source 300 includes a housing 308 that defines a reflector portion 310, a front surface 312, and an integral lighting load (not shown), such as an incandescent lamp, a halogen lamp, a compact fluorescent lamp, a light-emitting diode (LED) light engine, or other suitable light source. The lighting load may be located inside the housing 308, for example enclosed in, or surrounded by, the housing 308. The housing 308 may be configured such that light generated by the lighting load shines through at least a portion of the housing 308. For example, as shown, the reflector portion 310 of the housing 308 is configured to reflect light generated by the lighting load, such that the light shines through the front surface 312 of the housing 308. The front surface 312 of the housing 308 may be transparent or translucent, and may be flat or domed.

The controllable light source 300 include an enclosure portion 314 and a screw-in base 316 that is adapted to be screwed into an Edison socket. The screw-in base 316 may be configured to be installed in a three-way screw-in socket, such as the three-way socket 212 of the lamp 214 of the lighting control system 200, and may be referred to as a threaded base. The screw-in base 316 may define electrical connection portions that are configured to electrically connect the controllable light source 300 to an AC power source, for example via a three-way screw-in socket into which the controllable light source 300 is installed. As shown, the screw-in base 316 includes a first tip portion 318 that may be referred to as a first electrical connection portion or a first electrical interface with a three-way socket, a second tip portion 320 that may be referred to as a second electrical connection portion or a second electrical interface with the three-way socket, and a threaded portion 322 that may be referred to as a third electrical connection portion or a third electrical interface with the three-way socket. Examples of screw-in luminaires are described in greater detail in commonly assigned U.S. Pat. No. 8,008,866, issued Aug. 30, 2011, entitled "Hybrid Light Source," U.S. patent application publication no. 2012/0286689, published Nov. 15, 2012, entitled "Dimmable Screw-In Compact Fluorescent Lamp Having Integral Electronic Ballast Circuit," and U.S. patent application Ser. No. 13/829,834, filed Mar. 14, 2013, entitled "Controllable Light Source," the entire disclosures of which are incorporated herein by reference.

The controllable light source 300 may further include an integral load regulation circuit (not shown), such as a dimmer circuit, a ballast circuit, or an LED driver circuit, for controlling the intensity of the lighting load between a low-end intensity (e.g., approximately 1%) and a high-end intensity (e.g., approximately 100%). The controllable light source 300 may further include a control circuit (e.g., a microprocessor) that is configured to control the lighting load (e.g., via the load regulation circuit) in response to rotations of an adjustment knob of a three-way screw-in socket in which the controllable light source 300 is installed. The control circuit may be configured to generate status information based on the presence of an AC line voltage at the electrical connection portions of the screw-in base 316. The status information may correspond to present respective positions of the multi-position switches of a three-way screw-in socket into which the controllable light source 300 is installed.

The controllable light source 300 also may further include a wireless communication circuit (e.g., an RF receiver or transceiver) that is configured to receive and/or transmit wireless signals (e.g., RF signals 202). The wireless communication circuit may transmit one or more messages, for instance via radio frequency (RF) signals, in response to operation of the multi-position switches of the three-way screw-in socket in which the controllable light source 300 is installed. The one or more messages may include, for example, the status information (e.g., corresponding to respective present positions of the multi-position switches), and/or commands that are directed to one or more other devices that are associated with the controllable light source 300. A command included in such a message may, for example, cause respective lighting loads controlled by the one or more other devices to be synchronized with the integral lighting load.

The control circuit may cause the load regulation circuit to adjust the integral lighting load (e.g., turn the lighting load on or off, or adjust an intensity of the lighting load) in response to the receipt of one or more messages at the wireless communication circuit, for example messages received from an associated remote control device (e.g., the remote control device 230 of the lighting control system 200). The enclosure portion 314 may be configured to house one or more of the load regulation circuit, the control circuit, and the wireless communication circuit.

Figure 4:
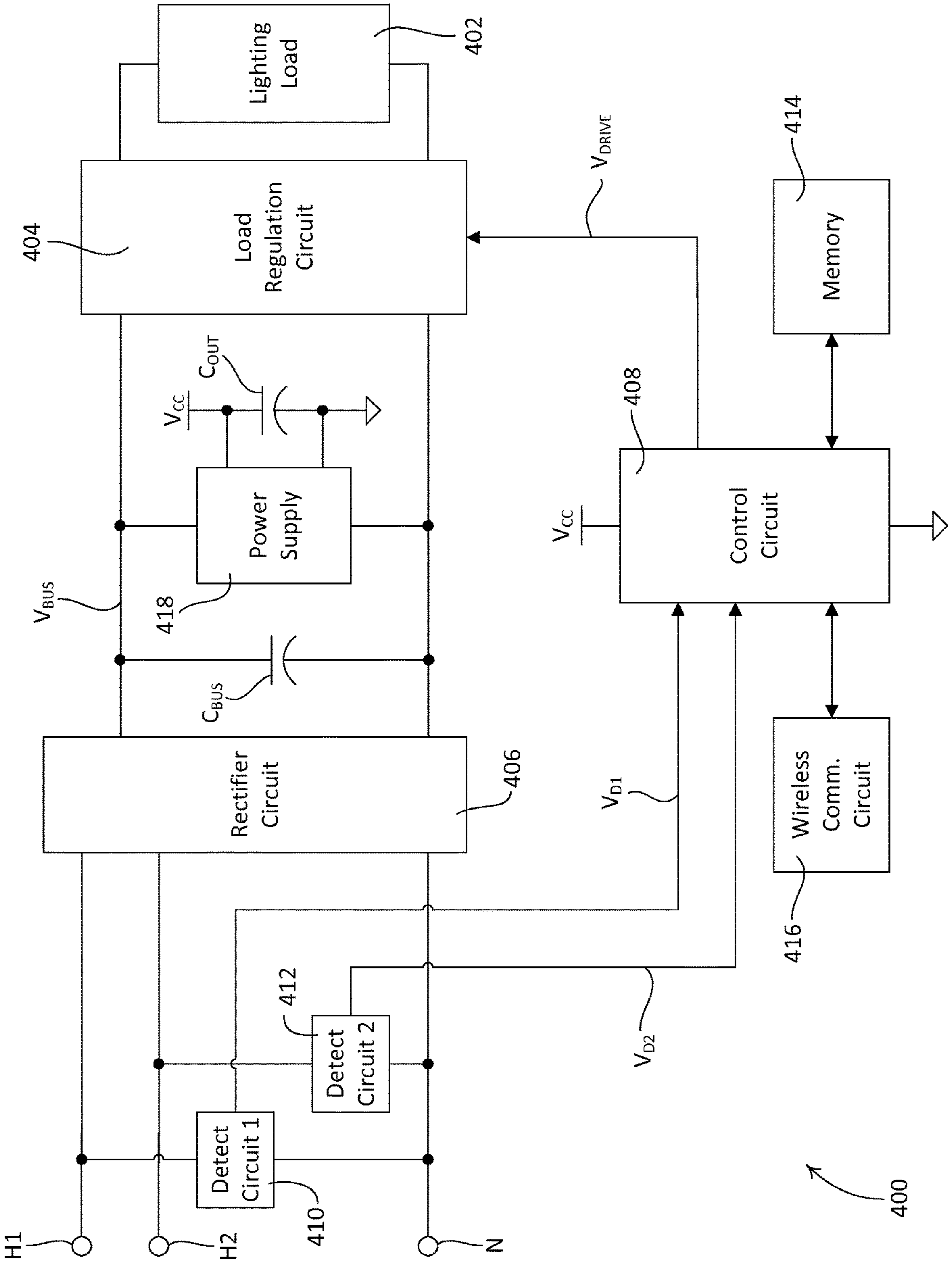
FIG. 4 is a simplified block circuit diagram of an example controllable light source.

FIG. 4 is a simplified block circuit diagram of an example controllable light source 400. The controllable light source 400 may be implemented, for example, as the controllable light source 300 shown in FIG. 3 and/or as the controllable light source 210 of the lighting control system 200 shown in FIG. 2. As shown, the controllable light source 400 includes a first hot electrical connection H1, a second hot electrical connection H2, and a neutral electrical connection N.

The first hot electrical connection H1 may correspond to a first electrical connection portion with a three-way screw-in socket in which the controllable light source 400 is installed, and may be referred to as a first electrical interface with the three-way screw-in socket. The second hot electrical connection H2 may correspond to a second electrical connection portion with the three-way screw-in socket, and may be referred to as a second electrical interface with the three-way screw-in socket. The neutral electrical connection N may correspond to a third electrical connection portion with the three-way screw-in socket, and may be referred to as a third electrical interface with the three-way screw-in socket. To illustrate, if the controllable light source 400 is implemented as the controllable light source 300 shown in FIG. 3, the first hot electrical connection H1 may correspond to the first tip portion 318 of the screw-in base 316, the second hot electrical connection H2 may correspond to the second tip portion 320 of the screw-in base 316, and the neutral electrical connection N may correspond to the threaded portion 322 of the screw-in base 316.

The first and second hot electrical connections H1, H2 and the neutral connection N, may be configured to place the controllable light source 400 in electrical communication with a three-way screw-in socket, such as the three-way socket 212 of the lamp 214 of the lighting control system 200. When the controllable light source 400 is installed in a three-way screw-in socket and the three-way screw-in socket is in any of positions B, C, and D, for example, the controllable light source 400 may receive power from an AC power source that is in electrical communication with the three-way screw-in socket. When the three-way screw-in socket is in position A, the controllable light source 400 may be unpowered.

As shown, the controllable light source 400 includes a lighting load 402. The lighting load 402 may be integral with the controllable light source 400, for instance enclosed within a housing of the controllable light source 400. The controllable light source 400 further includes a load regulation circuit 404 (e.g., a load control circuit) that is in electrical communication with the lighting load 402 and that is configured to control the intensity of the lighting load 402. The controllable light source 400 further includes a rectifier circuit 406 that is in electrical communication with the first and second hot connections H1, H2 and the neutral connection N. The rectifier circuit 406 may operate to generate a direct current (DC) bus voltage $V_{BUS}$ across a bus capacitor $C_{BUS}$. The load regulation circuit 404 may receive the bus voltage $V_{BUS}$. The load regulation circuit 404 may include, for example, a dimmer circuit for an incandescent lamp, an electronic ballast circuit for a compact fluorescent lamp (CFL), a light-emitting diode (LED) driver for an LED light engine, or the like. The controllable light source 400 may further include one or more electromagnetic interference (EMI) filters (not shown) that may be in electrical communication with the first and second hot connections H1, H2. The one or more EMI filters may operate to mitigate (e.g., prevent) noise generated by the load regulation circuit 404 from being conducted on the AC mains wiring.

The illustrated controllable light source 400 further includes a control circuit 408 that is communicatively coupled to (e.g., configured to communicate via electrical signaling with) the load regulation circuit 404, such that the control circuit 408 may cause the load regulation circuit 404 to control the amount of power delivered to the lighting load 402, and thereby to control the intensity of the lighting load 402. The control circuit 408 may include one or more of a processor (e.g., a microprocessor), a microcontroller, a programmable logic device (PLD), a field programmable gate array (FPGA), an application specific integrated circuit (ASIC), or any suitable processing device.

Figure 1:
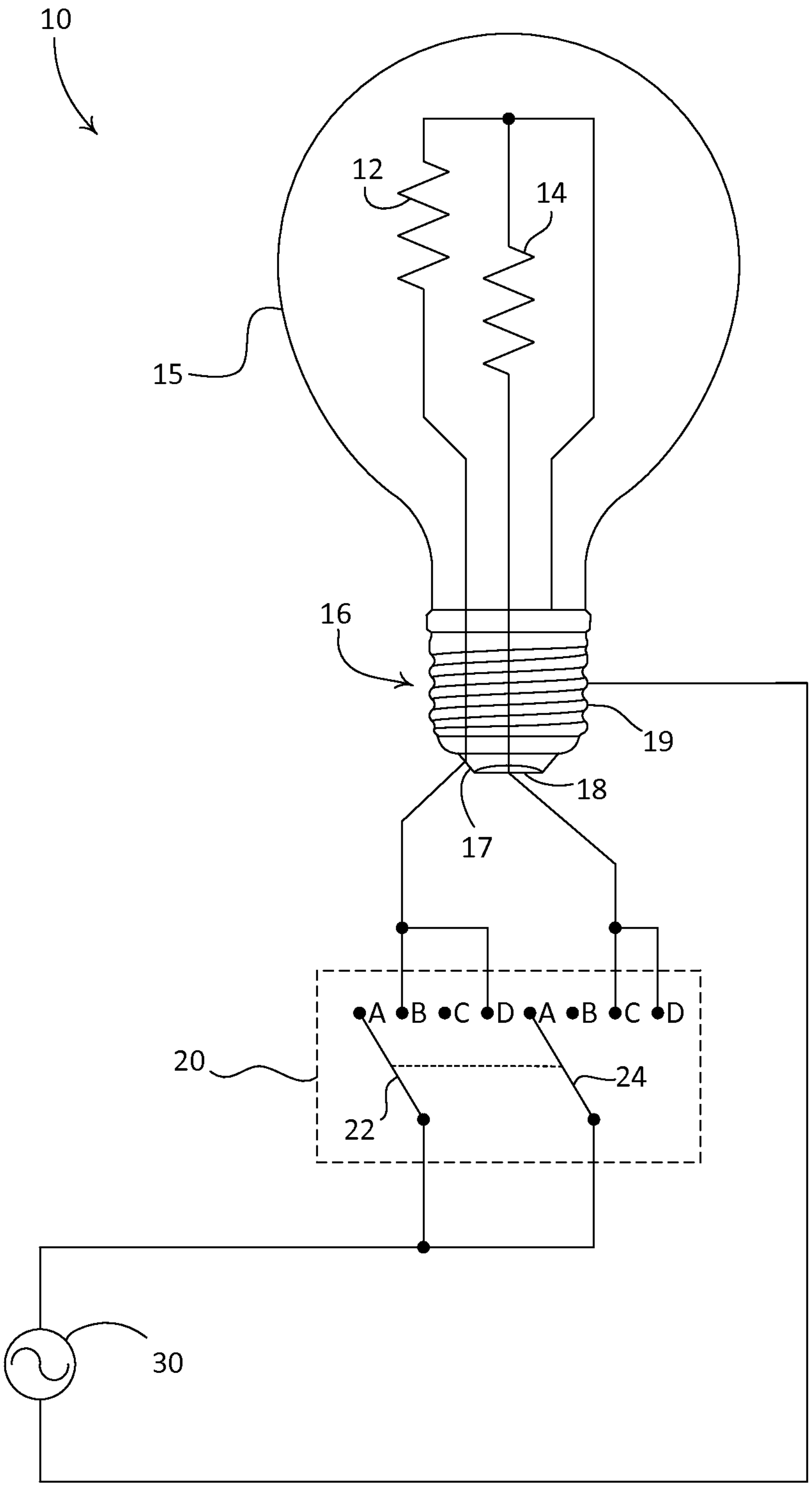
FIG. 1 (PRIOR ART)
FIG. 1 is a simplified diagram depicting an example prior art three-way light bulb and an example prior art three-way socket.

The controllable light source 400 further includes a first detect circuit 410 and a second detect circuit 412 that are electrically connected between the first and second hot connections H1, H2, respectively, and the neutral connection N. The first and second detect circuits 410, 412 may be configured to generate first and second detect signals $V_{D1}$, $V_{D2}$, that are representative of whether or not AC line voltage is present at the first and second hot connections H1, H2, respectively. For example, the first detect circuit 410 may drive the magnitude of the first detect signal $V_{D1}$ high when the three-way screw-in socket in which the controllable light source 400 is installed is in position B or D (e.g., as shown in FIG. 1), and the second detect circuit 412 may drive the magnitude of the second detect signal $V_{D2}$ high when the three-way socket is in position C or D (e.g., as shown in FIG. 1). The control circuit 408 may be configured to generate status information based on the presence of an AC line voltage detected by the first and second detect circuits 410, 412. The status information may correspond to present respective positions of the multi-position switches of a three-way screw-in socket in which the controllable light source 400 is installed.

The control circuit 408 may be configured to cause the load regulation circuit 404 to regulate the amount of power that is delivered to the lighting load 402 in response to the first and second detect signals $V_{D1}$, $V_{D2}$ (e.g., in response to rotations of the adjustment knob of the three-way screw-in socket in which the controllable light source 400 is installed). The control circuit 408 may generate a drive signal $V_{DRIVE}$, and may provide the drive signal $V_{DRIVE}$ to the load regulation circuit 404 for regulating an amount of power delivered to the lighting load 402, thereby controlling an intensity of the lighting load 402. The control circuit 408 may be further configured to cause the load regulation circuit 404 to regulate the amount of power that is delivered to the lighting load 402 in accordance with one or more lighting presets. For example, the respective positions of the multi-position switches of the three-way screw-in socket may be associated with corresponding lighting presets. To illustrate, in response to rotation of the adjustment knob, the control circuit 408 may cause the load regulation circuit 404 to adjust the intensity of the lighting load 402 in accordance with a change from a first lighting preset to a second lighting preset. For instance, the control circuit 408 may generate the drive signal $V_{DRIVE}$ based on a selected lighting preset.

The control circuit 408 may be further configured to determine respective present positions of the multi-position switches of the three-way screw-in socket. For example, the control circuit 408 may be configured to: determine that the multi-position switches of the three-way screw-in socket are in respective first positions if the AC line voltage is not present at either of the first and second hot connections H1, H2; determine that the multi-position switches of the three-way screw-in socket are in respective second positions if the AC line voltage is present at the first hot connection H1, but is not present at the second hot connection H2; determine that the multi-position switches of the three-way screw-in socket are in respective third positions if the AC line voltage is present at the second hot connection H2, but is not present at the first hot connection H1; and determine that the multi-position switches of the three-way screw-in socket are in respective fourth positions if the AC line voltage is present at both the first and second hot connections H1, H2. The control circuit 408 may be configured to generate status information based on the respective present positions of the multi-position switches of the three-way screw-in socket.

The illustrated controllable light source 400 further includes a memory 414. The memory 414 may be communicatively coupled to the control circuit 408, and may operate to store information, such as one or more lighting presets that may be associated with respective positions of the multi-position switches of the three-way screw-in socket. The one or more lighting presets may, for example, define how the control circuit 408 causes the load regulation circuit 404 to adjust the lighting load 402, for instance in response to the first and second detect signals $V_{D1}$, $V_{D2}$ The control circuit 408 may be configured to store such information in, and/or to retrieve such information from, the memory 414. The memory 414 may include any component suitable for storing such information. For example, the memory 414 may include one or more components of volatile and/or non-volatile memory, in any combination. The memory 414 may be internal and/or external with respect to the control circuit 408. For example, the memory 414 may be implemented as an external integrated circuit (IC), or as an internal circuit of the control circuit 408 (e.g., integrated within a microchip).

As shown, the controllable light source 400 further includes a wireless communication circuit 416. The wireless communication circuit 416 may include a transceiver that is coupled to an antenna for transmitting and receiving signals (e.g., an RF transceiver that is configured to transmit and/or receive RF signals, such as RF signals 202 shown in FIG. 2). Alternatively, the wireless communication circuit 416 may include an RF transmitter for transmitting RF signals, an RF receiver for receiving RF signals, or an infrared (IR) transmitter and/or receiver for transmitting and/or receiving IR signals. The control circuit 408 may be communicatively coupled to the wireless communication circuit 416, for example such that the control circuit 408 may cause the wireless communication circuit 416 to transmit one or more messages via RF signals. The one or more messages may include, for example, the status information (e.g., corresponding to respective present positions of the multi-position switches), information related to a currently selected lighting preset, and/or or a command that is directed to one or more other devices that are associated with the controllable light source 400. A command included in such a message may, for example, cause respective lighting loads controlled by the one or more other devices to be synchronized with the lighting load 402.

The controllable light source 400 further includes a power supply 418 that is electrically connected to the bus voltage $V_{BUS}$, to generate a DC supply voltage $V_{CC}$ across an output capacitor $C_{OUT}$. The supply voltage $V_{CC}$ may be used to power one or more of the control circuit 408, the memory 414, the wireless communication circuit 416, and/or other low-voltage circuitry of the controllable light source 400. When the multi-position switches of a three-way screw-in socket in which the controllable light source 400 is installed are in respective positions B, C, or D, the power supply 418 may generate the supply voltage $V_{CC}$. When the multi-position switches of the three-way screw-in socket are in respective positions A, the controllable light source 400 may be unpowered, and the lighting load 402 may be off. The output capacitor $C_{OUT}$ of the power supply 418 may have a capacitance large enough to power the control circuit 408 for a period of time after the multi-position switches of the three-way screw-in socket are moved to respective positions A, such that the control circuit 408 is able to perform one or more functions before the magnitude of the supply voltage $V_{CC}$ falls too low to power the control circuit 408.

In accordance with an example of operation of the controllable light source 400, the control circuit 408 may be configured to cause the load regulation circuit 404 to control the amount of power that is delivered to the lighting load 402, and thereby the intensity of the lighting load 402, in response to rotations of the adjustment knob of a three-way screw-in socket in which the controllable light source 400 is installed. The control circuit 408 may be further configured to cause the load regulation circuit 404 to control the amount of power that is delivered to the lighting load 402 in response to one or more RF signals (e.g., one or more messages) that are received by the wireless communication circuit 416 from one or more other devices that are associated with the controllable light source 400. To illustrate, if the controllable light source 400 is implemented as the controllable light source 210 of the lighting control system 200 shown in FIG. 2, the control circuit 408 may be configured to cause the load regulation circuit 404 to adjust the intensity of the lighting load 402 in response to one or more messages received from the remote control device 230.

The control circuit 408 may be further configured to cause the wireless communication circuit 416 to transmit one or more messages that include information related to the position of the multi-position switches of the three-way screw-in socket. For example, the one or more messages transmitted by the wireless communication circuit 416 may include the status information (e.g., corresponding to respective present positions of the multi-position switches). In another example, the one or more messages transmitted by the wireless communication circuit 416 may include a light intensity that is associated with a lighting preset selected by the control circuit 408 in response to the position of the multi-position switches of the three-way screw-in socket. Respective lighting presets may be selected, for instance, when the multi-position switches of the three-way screw-in socket are operated to respective positions B, C, or D (e.g., such that the controllable light source 400 receives power from the AC power source).

The one or more messages may further, or alternatively, include a command that is directed to another device that is associated with the controllable light source 400, such as an associated lighting control device. The command may cause the associated device to adjust an operational characteristic of a corresponding lighting load that is controlled by the associated device, for example to adjust the intensity of the corresponding lighting load to match the light intensity associated with the lighting preset. This may, for example, cause the intensity of the corresponding lighting load to be synchronized with the intensity of the lighting load 402. In this regard, the controllable light source 400 may be configured to operate as a control device, for example as a control device in a lighting control system with which the controllable light source 400 is associated (e.g., a lighting control system of which the controllable light source 400 is a member).

When the multi-position switches of the three-way screw-in socket are operated to respective positions A (e.g., such that the controllable light source 400 does not receive power from the AC power source), the output capacitor $C_{OUT}$ of the power supply 418 may maintain the magnitude of supply voltage $V_{CC}$ high enough for a period of time, such that the control circuit 408 may control the load regulation circuit 404 to turn the lighting load 402 off and to transmit one or more messages that include an off command, for instance before the control circuit 408 shuts down.

Figure 5:
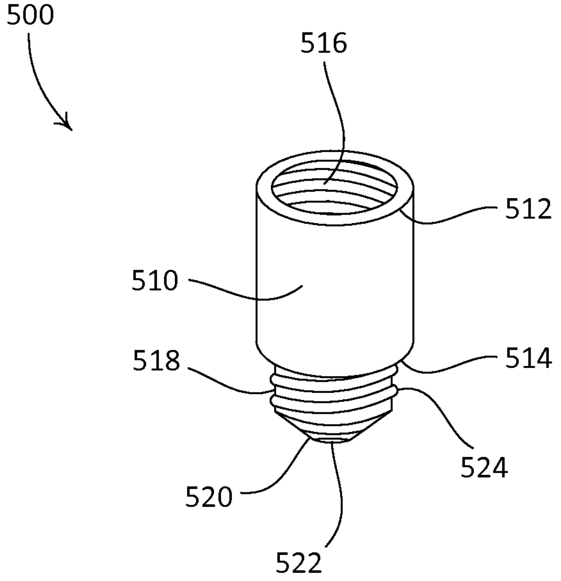
FIG. 5 depicts a perspective view of an example three-way socket control device.

FIG. 5 depicts an example three-way socket control device 500 that may be configured to be installed in a three-way screw-in socket. The three-way socket control device 500 may be configured to control a lighting load that is in electrical communication with the three-way socket control device 500, and/or to control one or more other devices that are associated with the three-way socket control device 500. The three-way socket control device 500 may be referred to as a smart screw-in three-way lamp control device.

As shown, the three-way socket control device 500 includes a cylindrically shaped body 510 that defines a first end 512 and an opposed second end 514. The three-way socket control device 500 includes a threaded receptacle 516 that extends into the first end 512 of the body 510, and that is configured to receive a screw-in lighting load, such as an incandescent lamp, a halogen lamp, a compact fluorescent lamp, a light-emitting diode (LED) lamp, or other suitable light source. For example, as shown, the threaded receptacle 516 is configured as a screw-in Edison socket that is configured to receive a standard light bulb.

The illustrated three-way socket control device 500 further includes a screw-in base 518 that is adapted to be screwed into an Edison socket. The screw-in base 518 may be configured to be installed in a three-way screw-in socket, such as the three-way socket 212 of the lamp 214 of the lighting control system 200, and may be referred to as a threaded base. The screw-in base 518 may define electrical connection portions that are configured to electrically connect the three-way socket control device 500 to an AC power source, for example via a three-way screw-in socket into which the three-way socket control device 500 is installed. As shown, the screw-in base 518 includes a first tip portion 520 that may be referred to as a first electrical connection portion or a first electrical interface with a three-way socket, a second tip portion 522 that may be referred to as a second electrical connection portion or a second electrical interface with the three-way socket, and a threaded portion 524 that may be referred to as a third electrical connection portion or a third electrical interface with the three-way socket.

When the three-way socket control device 500 is installed in a three-way screw-in socket, the first, second, and third electrical connection portions may place the three-way socket control device 500 in electrical communication with an AC power source. The threaded receptacle 516 may be in electrical communication with the screw-in base 518, such that a lighting load that is installed in the threaded receptacle 516 may be powered by the AC power source, via the screw-in base 518.

The three-way socket control device 500 may include an integral load regulation circuit (not shown) that is in electrical communication with the screw-in base 518. The load regulation circuit may be, for example, a dimmer circuit, a ballast circuit, or a LED driver circuit. The load regulation circuit may be configured to control the intensity of a lighting load that is installed in the threaded receptacle 516 between a low-end intensity (e.g., approximately 1%) and a high-end intensity (e.g., approximately 100%). The load regulation circuit may be housed in the body 510, for example.

The three-way socket control device 500 may include a control circuit, such as a microprocessor, (not shown) that may be configured to cause the load regulation circuit to control a lighting load that is installed in the threaded receptacle 516, for example in response to rotations of an adjustment knob of a three-way screw-in socket in which the three-way socket control device 500 is installed. The three-way socket control device 500 may be configured to control the intensity of the lighting load according to respective presets, for example, to adjust the intensity of the lighting load to a respective present intensity (e.g., approximately 0%, 33%, 66%, and 100%) in response to the position of the multi-position switches of the three-way screw-in socket. Accordingly, the three-way socket control device 500 may enable a standard screw-in bulb to be controlled like a three-way light bulb. The control circuit may be configured to generate status information based on the presence of an AC line voltage at the electrical connection portions of the screw-in base 518. The status information may correspond to present respective positions of the multi-position switches of a three-way screw-in socket into which the three-way socket control device 500 is installed.

The three-way socket control device 500 may further include a wireless communication circuit, such as an RF transceiver or RF receiver, (not shown) that is coupled to an antenna and that is communicatively coupled to the control circuit. The wireless communication circuit may be housed in the body 510, for example. The wireless communication circuit may be configured to transmit and/or receive wireless messages (e.g., via RF signals).

The three-way socket control device 500 may be configured to transmit one or more messages, for instance in response to rotations of the adjustment knob of the three-way screw in socket in which the three-way socket control device 500 is installed. The one or more messages may include, for example, the status information (e.g., corresponding to respective present positions of the multi-position switches), and/or commands that are directed to one or more other devices that are associated with three-way socket control device 500. A command included in such a message may, for example, cause respective lighting loads controlled by the one or more other devices to be synchronized with a lighting load that is installed in the threaded receptacle 516 (e.g., by synchronizing the intensity of corresponding lighting loads that are controlled by the one or more devices with the intensity of the lighting load that is installed in the threaded receptacle 516). The three-way socket control device 500 may be further configured to turn the lighting load that is installed in the threaded receptacle on and off, and/or to adjust the intensity of the lighting load (e.g., via the load regulation circuit) in response to one or more messages received at the wireless communication circuit, for instance via one or more received RF signals.

The three-way socket control device 500 may omit the integral load regulation circuit. In such a configuration, the threaded receptacle 516 may be in electrical communication (e.g., directly) with the first and second tip portions 520, 522 and the threaded portion 524. Such a configuration of the three-way socket control device 500 may be configured to transmit one or more messages in response to the respective positions of multi-position switches of a three-way screw-in socket in which the three-way socket control device 500 is installed (e.g., responsive to rotations of an adjustment knob of the three-way screw-in socket). The one or more messages may include, for example, the status information (e.g., corresponding to respective present positions of the multi-position switches), and/or commands that are directed to one or more other devices that are associated with three-way socket control device 500. Such commands may, for example, cause one or more devices that are associated with the three-way socket control device 500 to adjust the intensity of corresponding lighting loads that are controlled by the one or more devices.

Figure 6:
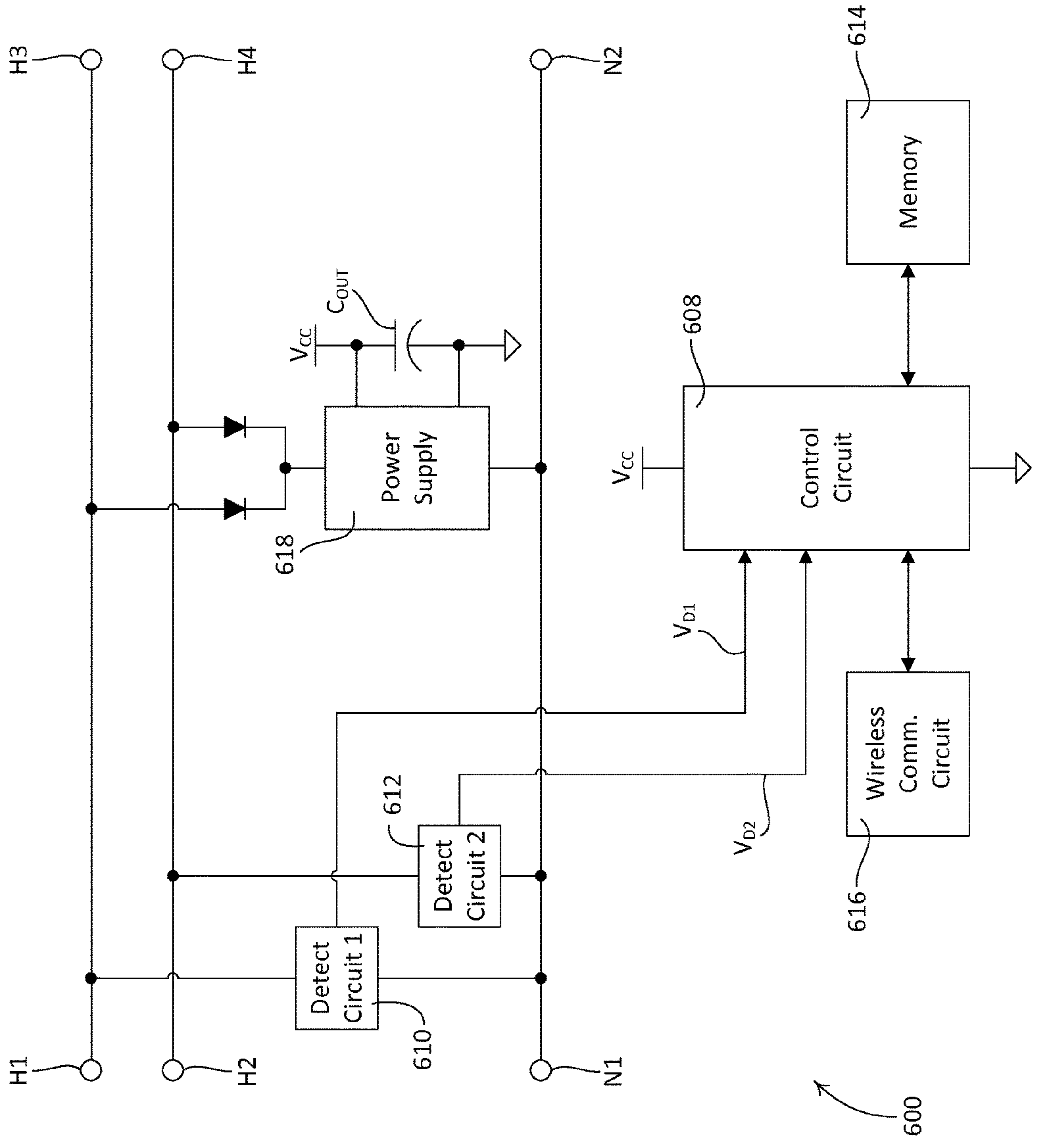
FIG. 6 is a simplified block circuit diagram of an example three-way socket control device.

FIG. 6 is a simplified block circuit diagram of an example three-way socket control device 600. The three-way socket control device 600 may be implemented, for example, as the three-way socket control device 500 shown in FIG. 5. As shown, the three-way socket control device 600 includes a first hot electrical connection H1, a second hot electrical connection H2, and a first neutral electrical connection N1.

The first hot electrical connection H1 may correspond to a first electrical connection portion with a three-way screw-in socket in which the three-way socket control device 600 is installed, and may be referred to as a first electrical interface with the three-way screw-in socket. The second hot electrical connection H2 may correspond to a second electrical connection portion with the three-way screw-in socket, and may be referred to as a second electrical interface with the three-way screw-in socket. The first neutral electrical connection N1 may correspond to a third electrical connection portion with the three-way screw-in socket, and may be referred to as a third electrical interface with the three-way screw-in socket. To illustrate, if the three-way socket control device 600 is implemented as the three-way socket control device 500 shown in FIG. 5, the first hot electrical connection H1 may correspond to the first tip portion 520 of the screw-in base 518, the second hot electrical connection H2 may correspond to the second tip portion 522 of the screw-in base 518, and the first neutral electrical connection N1 may correspond to the threaded portion 524 of the screw-in base 518.

The first and second hot electrical connections H1, H2 and the neutral connection N, may be configured to place the three-way socket control device 600 in electrical communication with a three-way screw-in socket, such as the three-way socket 212 of the lamp 214 of the lighting control system 200. When the three-way socket control device 600 is installed in a three-way screw-in socket and the three-way screw-in socket is in any of positions B, C, and D, for example, the three-way socket control device 600 may receive power from an AC power source that is in electrical communication with the three-way screw-in socket. When the three-way screw-in socket is in position A, the three-way socket control device 600 may be unpowered.

The illustrated three-way socket control device 600 further includes a third hot electrical connection H3, a fourth hot electrical connection H4, and a second neutral electrical connection N2. The third and fourth hot electrical connections H3, H4 and the second neutral electrical connection N2 may be configured to place a screw-in lighting load, such as a three-way light bulb (not shown) that is installed in the three-way socket control device 600 in electrical communication with the AC power source. To illustrate, if the three-way socket control device 600 is implemented as the three-way socket control device 500 shown in FIG. 5, the third and fourth hot electrical connections H3, H4 and the second neutral electrical connection N2 may correspond to electrical connection portions located in the threaded receptacle 516.

The illustrated three-way socket control device 600 further includes a control circuit 608. The control circuit 608 may include one or more of a processor (e.g., a microprocessor), a microcontroller, a programmable logic device (PLD), a field programmable gate array (FPGA), an application specific integrated circuit (ASIC), or any suitable processing device.

The three-way socket control device 600 further includes a first detect circuit 610 and a second detect circuit 612 that are electrically connected between the first and second hot connections H1, H2, respectively, and the neutral connection N. The first and second detect circuits 610, 612 may be configured to generate first and second detect signals $V_{D1}$, $V_{D2}$, that are representative of whether or not AC line voltage is present at the first and second hot connections H1, H2, respectively. For example, the first detect circuit 610 may drive the magnitude of the first detect signal $V_{D1}$ high when the three-way screw-in socket in which the three-way socket control device 600 is installed is in position B or D (e.g., as shown in FIG. 1), and the second detect circuit 612 may drive the magnitude of the second detect signal $V_{D2}$ high when the three-way socket is in position C or D (e.g., as shown in FIG. 1). The control circuit 608 may be configured to generate status information based on the presence of an AC line voltage detected by the first and second detect circuits 610, 612. The status information may correspond to present respective positions of the multi-position switches of a three-way screw-in socket in which the three-way socket control device 600 is installed.

The control circuit 608 may be configured to determine respective present positions of the multi-position switches of a three-way screw-in socket in which the three-way socket control device 600 is installed. For example, the control circuit 608 may be configured to: determine that the multi-position switches of the three-way screw-in socket are in respective first positions if the AC line voltage is not present at either of the first and second hot connections H1, H2; determine that the multi-position switches of the three-way screw-in socket are in respective second positions if the AC line voltage is present at the first hot connection H1, but is not present at the second hot connection H2; determine that the multi-position switches of the three-way screw-in socket are in respective third positions if the AC line voltage is present at the second hot connection H2, but is not present at the first hot connection H1; and determine that the multi-position switches of the three-way screw-in socket are in respective fourth positions if the AC line voltage is present at both the first and second hot connections H1, H2. The control circuit 608 may be configured to generate status information based on the respective present positions of the multi-position switches of the three-way screw-in socket.

The illustrated three-way socket control device 600 further includes a memory 614. The memory 614 may be communicatively coupled to the control circuit 608, and may operate to store information, such as one or more lighting presets that may be associated with respective positions of the multi-position switches of the three-way screw-in socket. The control circuit 608 may be configured to store such information in, and/or to retrieve such information from, the memory 614. The memory 614 may include any component suitable for storing such information. For example, the memory 614 may include one or more components of volatile and/or non-volatile memory, in any combination. The memory 614 may be internal and/or external with respect to the control circuit 608. For example, the memory 614 may be implemented as an external integrated circuit (IC), or as an internal circuit of the control circuit 608 (e.g., integrated within a microchip).

As shown, the three-way socket control device 600 further includes a wireless communication circuit 616. The wireless communication circuit 616 may include a transceiver that is coupled to an antenna for transmitting and receiving signals (e.g., an RF transceiver that is configured to transmit and/or receive RF signals, such as RF signals 202 shown in FIG. 2). Alternatively, the wireless communication circuit 616 may include an RF transmitter for transmitting RF signals, an RF receiver for receiving RF signals, or an infrared (IR) transmitter and/or receiver for transmitting and/or receiving IR signals. The control circuit 608 may be communicatively coupled to the wireless communication circuit 616, for example such that the control circuit 608 may cause the wireless communication circuit 616 to transmit one or more messages via RF signals. The one or more messages may include, for example, the status information (e.g., corresponding to respective present positions of the multi-position switches), information related to a currently selected lighting preset, and/or or a command that is directed to one or more other devices that are associated with the three-way socket control device 600. A command included in such a message may, for example, cause respective lighting loads controlled by the one or more other devices to be synchronized with a three-way bulb that is installed in a threaded receptacle of the three-way socket control device 600.

The three-way socket control device 600 further includes a power supply 618 that is configured to generate a DC supply voltage $V_{CC}$ across an output capacitor $C_{OUT}$. The supply voltage $V_{CC}$ may be used to power one or more of the control circuit 608, the memory 614, the wireless communication circuit 616, and/or other low-voltage circuitry of the three-way socket control device 600. When the multi-position switches of a three-way screw-in socket in which the three-way socket control device 600 is installed are in respective positions B, C, or D, the power supply 618 may generate the supply voltage $V_{CC}$. When the multi-position switches of the three-way screw-in socket are in respective positions A, the three-way socket control device 600 may be unpowered. The output capacitor $C_{OUT}$ of the power supply 618 may have a capacitance large enough to power the control circuit 608 for a period of time after the multi-position switches of the three-way screw-in socket are moved to respective positions A, such that the control circuit 608 is able to perform one or more functions before the magnitude of the supply voltage $V_{CC}$ falls too low to power the control circuit 608.

In accordance with an example of operation of the three-way socket control device 600, the control circuit 608 may be configured to cause the wireless communication circuit 616 to transmit one or more messages that include information related to the position of the multi-position switches of the three-way screw-in socket. For example, the one or more messages transmitted by the wireless communication circuit 616 may include the status information (e.g., corresponding to respective present positions of the multi-position switches). In another example, the one or more messages transmitted by the wireless communication circuit 616 may include a light intensity that is associated with a lighting preset selected by the control circuit 608 in response to the position of the multi-position switches of the three-way screw-in socket. Respective lighting presets may be selected, for instance, when the multi-position switches of the three-way screw-in socket are operated to respective positions B, C, or D (e.g., such that the three-way socket control device 600 receives power from the AC power source).

The one or more messages may further, or alternatively, include a command that is directed to another device that is associated with the three-way socket control device 600, such as an associated lighting control device. The command may cause the associated device to adjust an operational characteristic of a corresponding lighting load that is controlled by the associated device, for example to adjust the intensity of the corresponding lighting load to match the light intensity associated with the lighting preset. This may, for example, cause the intensity of the corresponding lighting load to be synchronized with the intensity of a three-way bulb installed in a threaded receptacle of the three-way socket control device 600. In this regard, the three-way socket control device 600 may be configured to operate as a control device, for example as a control device in a lighting control system with which the three-way socket control device 600 is associated (e.g., a lighting control system of which the three-way socket control device 600 is a member).

The one or more messages may alternatively include a command that is directed to a lighting load that is installed in a threaded receptacle of the three-way socket control device 600, such as an RF bulb. The command may be received, for example, by a receiver (e.g., an RF receiver) of the RF bulb, and may cause the RF bulb to adjust an operational characteristic, such as an intensity of the RF bulb. Such a configuration of the three-way socket control device 600 might have two output connections (e.g., hot and neutral), such that the RF bulb receives power when the multi-positions switches of the three-way screw-in socket are in positions B, C, or D.

When the multi-position switches of the three-way screw-in socket are operated to respective positions A (e.g., such that the three-way socket control device 600 does not receive power from the AC power source), the output capacitor $C_{OUT}$ of the power supply 618 may maintain the magnitude of supply voltage $V_{CC}$ high enough for a period of time, such that the control circuit 608 may transmit one or more messages before the control circuit 608 shuts down.

Figure 7:
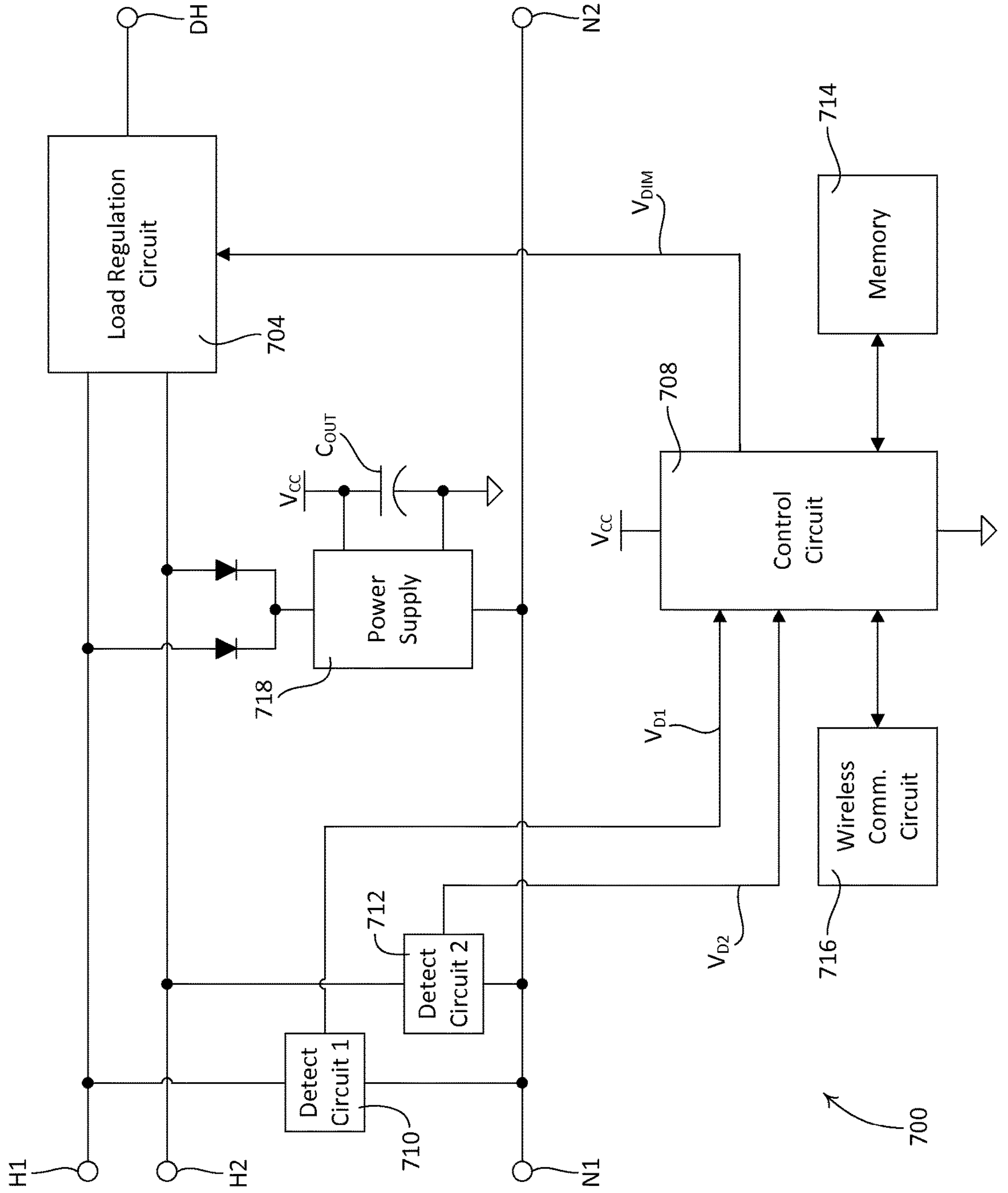
FIG. 7 is a simplified block circuit diagram of another example three-way socket control device.

FIG. 7 is a simplified block circuit diagram of another example three-way socket control device 700. The three-way socket control device 700 may be implemented, for example, as the three-way socket control device 500 shown in FIG. 5. As shown, the three-way socket control device 700 includes a first hot electrical connection H1, a second hot electrical connection H2, and a first neutral electrical connection N1.

The first hot electrical connection H1 may correspond to a first electrical connection portion with a three-way screw-in socket in which the three-way socket control device 700 is installed, and may be referred to as a first electrical interface with the three-way screw-in socket. The second hot electrical connection H2 may correspond to a second electrical connection portion with the three-way screw-in socket, and may be referred to as a second electrical interface with the three-way screw-in socket. The first neutral electrical connection N1 may correspond to a third electrical connection portion with the three-way screw-in socket, and may be referred to as a third electrical interface with the three-way screw-in socket. To illustrate, if the three-way socket control device 700 is implemented as the three-way socket control device 500 shown in FIG. 5, the first hot electrical connection H1 may correspond to the first tip portion 520 of the screw-in base 518, the second hot electrical connection H2 may correspond to the second tip portion 522 of the screw-in base 518, and the first neutral electrical connection N1 may correspond to the threaded portion 524 of the screw-in base 518.

The first and second hot electrical connections H1, H2 and the neutral connection N, may be configured to place the three-way socket control device 700 in electrical communication with a three-way screw-in socket, such as the three-way socket 212 of the lamp 214 of the lighting control system 200. When the three-way socket control device 700 is installed in a three-way screw-in socket and the three-way screw-in socket is in any of positions B, C, and D, for example, the three-way socket control device 700 may receive power from an AC power source that is in electrical communication with the three-way screw-in socket. When the three-way screw-in socket is in position A, the three-way socket control device 700 may be unpowered.

The illustrated three-way socket control device 700 further includes a third hot electrical connection DH that may be referred to as a dimmed hot electrical connection, and a second neutral electrical connection N2. The dimmed hot electrical connection DH and the second neutral electrical connection N2 may be configured to place a screw-in lighting load, such as a standard light bulb (not shown) that is installed in the three-way socket control device 700 in electrical communication with the AC power source. To illustrate, if the three-way socket control device 700 is implemented as the three-way socket control device 500 shown in FIG. 5, the dimmed hot electrical connection DH and the second neutral electrical connection N2 may correspond to electrical connection portions located in the threaded receptacle 516.

As shown, the three-way socket control device 700 further includes a load regulation circuit 704 (e.g., a load control circuit). The load regulation circuit 704 may be configured to control a lighting load (not shown) that is placed in electrical communication with the dimmed hot electrical connection DH and the second neutral electrical connection N2, such as a standard bulb that is installed into a threaded receptacle of the three-way socket control device 700. The load regulation circuit 704 may include, for example, a dimmer circuit for an incandescent lamp, an electronic ballast circuit for a compact fluorescent lamp (CFL), a light-emitting diode (LED) driver for an LED light engine, or the like. The three-way socket control device 700 may further include one or more electromagnetic interference (EMI) filters (not shown) that may be in electrical communication with the first and second hot connections H1, H2. The one or more EMI filters may operate to mitigate (e.g., prevent) noise generated by the load regulation circuit 704 from being conducted on the AC mains wiring.

The illustrated three-way socket control device 700 further includes a control circuit 708 that is communicatively coupled to (e.g., configured to communicate via electrical signaling with) the load regulation circuit 704, such that the control circuit 708 may cause the load regulation circuit 704 to control the amount of power delivered to a lighting load that is in electrical communication with the load regulation circuit 704 (e.g., installed in a threaded receptacle of the three-way socket control device 700). The control circuit 708 may include one or more of a processor (e.g., a microprocessor), a microcontroller, a programmable logic device (PLD), a field programmable gate array (FPGA), an application specific integrated circuit (ASIC), or any suitable processing device.

The three-way socket control device 700 further includes a first detect circuit 710 and a second detect circuit 712 that are electrically connected between the first and second hot connections H1, H2, respectively, and the neutral connection N. The first and second detect circuits 710, 712 may be configured to generate first and second detect signals $V_{D1}$, $V_{D2}$, that are representative of whether or not AC line voltage is present at the first and second hot connections H1, H2, respectively. For example, the first detect circuit 710 may drive the magnitude of the first detect signal $V_{D1}$ high when the three-way screw-in socket in which the three-way socket control device 700 is installed is in position B or D (e.g., as shown in FIG. 1), and the second detect circuit 712 may drive the magnitude of the second detect signal $V_{D2}$ high when the three-way socket is in position C or D (e.g., as shown in FIG. 1). The control circuit 708 may be configured to generate status information based on the presence of an AC line voltage detected by the first and second detect circuits 710, 712. The status information may correspond to present respective positions of the multi-position switches of a three-way screw-in socket in which the three-way socket control device 700 is installed.

The control circuit 708 may be configured to cause the load regulation circuit 704 to regulate the amount of power that is delivered to the lighting load that is in electrical communication with the load regulation circuit 704 (e.g., a lighting load that is installed in a threaded receptacle of the three-way socket control device 700), in response to the first and second detect signals $V_{D1}$, $V_{D2}$ (e.g., in response to rotations of the adjustment knob of the three-way screw-in socket in which the three-way socket control device 700 is installed). The control circuit 708 may generate a dimming signal $V_{DIM}$, and may provide the dimming signal $V_{DIM}$ to the load regulation circuit 704 for regulating an amount of power delivered to the installed lighting load, thereby controlling an intensity of the installed lighting load. The control circuit 708 may be further configured to cause the load regulation circuit 704 to regulate the amount of power that is delivered to the installed lighting load in accordance with one or more lighting presets. For example, the respective positions of the multi-position switches of the three-way screw-in socket may be associated with corresponding lighting presets. To illustrate, in response to rotation of the adjustment knob, the control circuit 708 may cause the load regulation circuit 704 to adjust the intensity of the installed lighting load in accordance with a change from a first lighting preset to a second lighting preset. For instance, the control circuit 708 may generate the dimming signal $V_{DIM}$ based on a selected lighting preset.

The control circuit 708 may be further configured to determine respective present positions of the multi-position switches of the three-way screw-in socket. For example, the control circuit 708 may be configured to: determine that the multi-position switches of the three-way screw-in socket are in respective first positions if the AC line voltage is not present at either of the first and second hot connections H1, H2; determine that the multi-position switches of the three-way screw-in socket are in respective second positions if the AC line voltage is present at the first hot connection H1, but is not present at the second hot connection H2, determine that the multi-position switches of the three-way screw-in socket are in respective third positions if the AC line voltage is present at the second hot connection H2, but is not present at the first hot connection H1; and determine that the multi-position switches of the three-way screw-in socket are in respective fourth positions if the AC line voltage is present at both the first and second hot connections H1, H2. The control circuit 708 may be configured to generate status information based on the respective present positions of the multi-position switches of the three-way screw-in socket.

The illustrated three-way socket control device 700 further includes a memory 714. The memory 714 may be communicatively coupled to the control circuit 708, and may operate to store information, such as one or more lighting presets that may define how the control circuit 708 causes the load regulation circuit 704 to adjust an installed lighting load, for instance in response to the first and second detect signals $V_{D1}$, $V_{D2}$ The control circuit 708 may be configured to store such information in, and/or to retrieve such information from, the memory 714. The memory 714 may include any component suitable for storing such information. For example, the memory 714 may include one or more components of volatile and/or non-volatile memory, in any combination. The memory 714 may be internal and/or external with respect to the control circuit 708. For example, the memory 714 may be implemented as an external integrated circuit (IC), or as an internal circuit of the control circuit 708 (e.g., integrated within a microchip).

As shown, the three-way socket control device 700 further includes a wireless communication circuit 716. The wireless communication circuit 716 may include a transceiver that is coupled to an antenna for transmitting and receiving signals (e.g., an RF transceiver that is configured to transmit and/or receive RF signals, such as RF signals 202 shown in FIG. 2). Alternatively, the wireless communication circuit 716 may include an RF transmitter for transmitting RF signals, an RF receiver for receiving RF signals, or an infrared (IR) transmitter and/or receiver for transmitting and/or receiving IR signals. The control circuit 708 may be communicatively coupled to the wireless communication circuit 716, for example such that the control circuit 708 may cause the wireless communication circuit 716 to transmit one or more messages via RF signals. The one or more messages may include, for example, the status information (e.g., corresponding to respective present positions of the multi-position switches), information related to a currently selected lighting preset, and/or or a command that is directed to one or more other devices that are associated with the three-way socket control device 700. A command included in such a message may, for example, cause respective lighting loads controlled by the one or more other devices to be synchronized with a standard light bulb that is installed in a threaded receptacle of the three-way socket control device 700.

The three-way socket control device 700 further includes a power supply 718 that is configured to generate a DC supply voltage $V_{CC}$ across an output capacitor $C_{OUT}$. The supply voltage $V_{CC}$ may be used to power one or more of the control circuit 708, the memory 714, the wireless communication circuit 716, and/or other low-voltage circuitry of the three-way socket control device 700. When the multi-position switches of a three-way screw-in socket in which the three-way socket control device 700 is installed are in respective positions B, C, or D, the power supply 718 may generate the supply voltage $V_{CC}$. When the multi-position switches of the three-way screw-in socket are in respective positions A, the three-way socket control device 700 may be unpowered, and the installed lighting load may be off. The output capacitor $C_{OUT}$ of the power supply 718 may have a capacitance large enough to power the control circuit 708 for a period of time after the multi-position switches of the three-way screw-in socket are moved to respective positions A, such that the control circuit 708 is able to perform one or more functions before the magnitude of the supply voltage $V_{CC}$ falls too low to power the control circuit 708.

In accordance with an example of operation of the three-way socket control device 700, the control circuit 708 may be configured to cause the load regulation circuit 704 to control the amount of power that is delivered to the installed lighting load, and thereby the intensity of the installed lighting load, in response to rotations of the adjustment knob of a three-way screw-in socket in which the three-way socket control device 700 is installed. The control circuit 708 may be further configured to cause the load regulation circuit 704 to control the amount of power that is delivered to the installed lighting load in response to one or more RF signals (e.g., one or more messages) that are received by the wireless communication circuit 716 from one or more other devices that are associated with the three-way socket control device 700.

The control circuit 708 may be further configured to cause the wireless communication circuit 716 to transmit one or more messages that include information related to the position of the multi-position switches of the three-way screw-in socket. For example, the one or more messages transmitted by the wireless communication circuit 716 may include the status information (e.g., corresponding to respective present positions of the multi-position switches). In another example, the one or more messages transmitted by the wireless communication circuit 716 may include a light intensity that is associated with a lighting preset selected by the control circuit 708 in response to the position of the multi-position switches of the three-way screw-in socket. Respective lighting presets may be selected, for instance, when the multi-position switches of the three-way screw-in socket are operated to respective positions B, C, or D (e.g., such that the three-way socket control device 700 receives power from the AC power source).

The one or more messages may further, or alternatively, include a command that is directed to another device that is associated with the three-way socket control device 700, such as an associated lighting control device. The command may cause the associated device to adjust an operational characteristic of a corresponding lighting load that is controlled by the associated device, for example to adjust the intensity of the corresponding lighting load to match the light intensity associated with the lighting preset. This may, for example, cause the intensity of the corresponding lighting load to be synchronized with the intensity of a standard light bulb installed in a threaded receptacle of the three-way socket control device 700. In this regard, the three-way socket control device 700 may be configured to operate as a control device, for example as a control device in a lighting control system with which the three-way socket control device 700 is associated (e.g., a lighting control system of which the three-way socket control device 700 is a member).

When the multi-position switches of the three-way screw-in socket are operated to respective positions A (e.g., such that the three-way socket control device 700 does not receive power from the AC power source), the output capacitor $C_{OUT}$ of the power supply 718 may maintain the magnitude of supply voltage $V_{CC}$ high enough for a period of time, such that the control circuit 708 may control the load regulation circuit 704 to turn the installed lighting load off and to transmit one or more messages that include an off command, for instance before the control circuit 708 shuts down.

Figure 8:
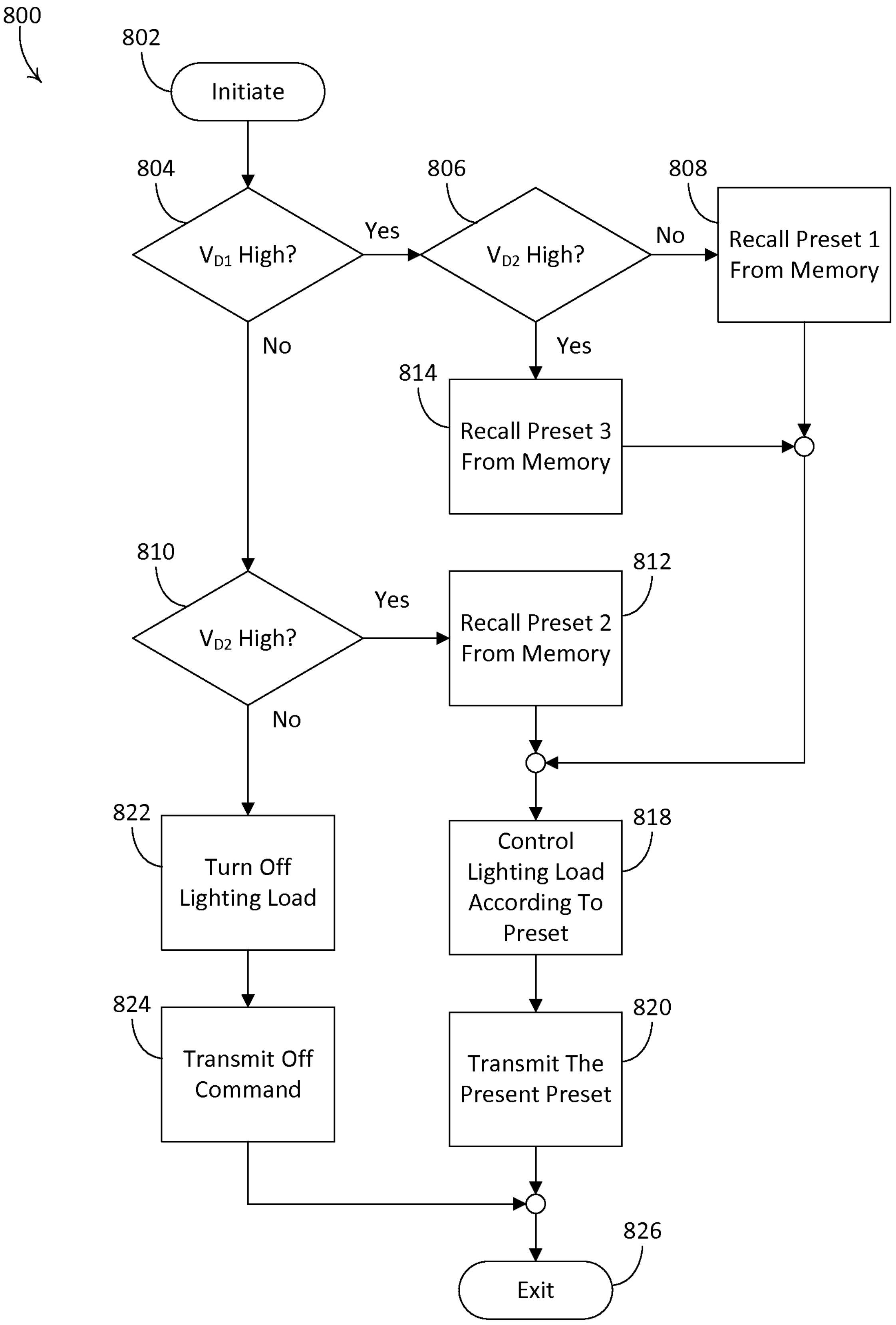
FIG. 8 depicts a flow diagram that illustrates an example process that may be executed by a control device that is configured to be installed in a three-way screw-in socket.

FIG. 8 illustrates an example process 800 that may be executed by a three-way socket control device (e.g., a control device that is configured to be installed in a three-way screw-in socket). The example process 800 is described herein in accordance with execution of the process 800 by the controllable light source 400. It should be appreciated, however, that the example process 800 may be adapted for execution by any suitable three-way socket control device, for instance the controllable light source 210, the controllable light source 300, the three-way socket control device 500, the three-way socket control device 600, the three-way socket control device 700, or the like. It should further be appreciated that one or more portions of the process 800 may be skipped or otherwise omitted during execution of the process, for example in accordance with corresponding capabilities of a three-way socket control device that is executing the process 800.

The example process 800 may be initiated at 802. For example, the process 800 may be executed by the control circuit 408 of the controllable light source 400 in response to changes in the first and second detect signals $V_{D1}$, $V_{D2}$ If the magnitude of the first detect signal $V_{D1}$ is high (e.g., at approximately the magnitude of the supply voltage $V_{CC}$) at 804, but the magnitude of the second detect signal $V_{D2}$ is low (e.g., at approximately circuit common) at 806, the control circuit 408 may, at 808, recall a first preset (e.g., Preset 1) from a memory (e.g., the memory 414). For example, the control circuit 408 may, at 808, recall a preset intensity in accordance with the first preset (e.g., approximately 33%) from the memory 414.

If the magnitude of the first detect signal $V_{D1}$ is low at 804, but the magnitude of the second detect signal $V_{D2}$ is high at 810, the control circuit 408 may, at 812, recall a second preset (e.g., Preset 2) from the memory 414. For example, the control circuit 408 may, at 812, recall a preset intensity in accordance with the second preset (e.g., approximately 66%) from the memory 414.

If the magnitude of the first detect signal $V_{D1}$ is high at 804, and the magnitude of the second detect signal $V_{D2}$ is high at 806, the control circuit 408 may, at 814, recall a third preset (e.g., Preset 3) from the memory 414. For example, the control circuit 408 may, at 814, recall a preset intensity in accordance with the third preset (e.g., approximately 100%) from the memory 414.

After recalling an appropriate preset from the memory 414, for example at 808, 812, or 814, the control circuit 408 may, at 818, cause the load regulation circuit 404 to adjust the intensity of the lighting load 402 in accordance with the recalled preset, for example to be equal to a predetermined light intensity that is associated with the recalled lighting preset. The control circuit 408 may then, at 820, cause the wireless communication circuit 416 to transmit one or more messages. The one or more messages may include information related to the recalled preset, and/or may include a command that is directed to one or more lighting control devices that are associated with the controllable light source 400. The command may cause the one or more associated lighting control devices to adjust the respective intensities of corresponding lighting loads in accordance with the recalled preset, for example. The process 800 may then exit at 826.

If the magnitude of the first detect signal $V_{D1}$ is low at 804, and the magnitude of the second detect signal $V_{D2}$ is low at 810, the control circuit 408 may, at 822, cause the lighting load 402 to be turned off. The control circuit 408 may, at 824, transmit one or more messages, for example to one or more lighting control devices that are associated with the controllable light source 400. The one or more messages may include a command that is directed to the one or more lighting control devices. The command may be, for example, an off that command that causes the one or more lighting control devices to turn off corresponding lighting loads. The process 800 may then exit at 826.

It should be appreciated that the status information (e.g., corresponding to respective positions of the multi-position switches of a three-way screw-in socket) that is generated by the devices described herein, including the controllable light source 210, the controllable light source 300, the controllable light source 400, the three-way socket control device 500, the three-way socket control device 600, and the three-way socket control device 700 may be used for alternative purposes, for example in addition to or in lieu of selecting a lighting preset. For example, the status information may be used for one or more of: selecting among colors emitted by one or more lighting loads; selecting a daylight setpoint (e.g., a target illumination level to which one or more devices adjust corresponding lighting loads in response to a daylight sensor); and selecting a mode of operation. Modes of operation may include, for example: enabling or disabling one or more occupancy sensors; a enabling or disabling one or more daylight sensors; enabling or disabling a timeclock schedule; enabling an energy savings mode (e.g., that limits a high end intensity of one or more lighting loads by a predetermined amount, such as 85%); or the like.

It should further be appreciated that a lighting preset is not limited to association with a predetermined intensity of a lighting load. For example, a lighting preset may additionally or alternatively be associated with respective predetermined positions of one or more motorized window treatments. To illustrate, the selection of a "bright" preset in accordance with the status information may cause one or more lighting loads to adjust to full intensity, and may cause one or more motorized window treatments to raise corresponding covering materials to respective fully opened positions.

The invention claimed is:

1. An electric load control apparatus, comprising:
- a housing that includes a base insertable in a 3-way socket;
- wireless communication circuitry; and
- control circuitry disposed within the housing and communicatively coupled to the wireless communication circuitry, the control circuitry to:
  - receive at least one of:
    - a first input responsive to placement of the 3-way socket in a first state; or
    - a second input responsive to placement of the 3-way socket in a second state;
  - generate an output signal that includes one of:
    - a first message responsive to receipt of the first input;
    - a second message responsive to receipt of the second input; or
    - a third message responsive to receipt of both the first input and the second input; and
  - communicate the output signal via the wireless communication circuitry.

2. The electric load control apparatus of claim 1, the control circuitry to further:

retrieve, from communicatively coupled memory circuitry, one of:

data representative of the first message responsive to receipt of the first input;

data representative of the second message responsive to receipt of the second input; or data representative of the third message responsive to receipt of both the first input and the second input.

3. The electric load control apparatus of claim 1, wherein to receive at least one of the first input or the second input, the control circuitry to further:

receive at least one of:

the first input responsive to application of line voltage to a first terminal in the 3-way socket; or the second input responsive to application of line voltage to a second terminal in the 3-way socket.

4. The electric load control apparatus of claim 1, wherein to communicate the output signal via the wireless communication circuitry, the control circuitry to further:

broadcast the output signal via the wireless communication circuitry.

5. An electric load control method, comprising:

receiving, by control circuitry disposed in a housing that includes a base insertable in a 3-way socket, at least one of:

a first input responsive to placement of the 3-way socket in a first state; or a second input responsive to placement of the 3-way socket in a second state;

generating, by the control circuitry, an output signal that includes one of:

a first message responsive to receipt of the first input;

a second message responsive to receipt of the second input; or a third message responsive to receipt of both the first input and the second input; and communicating, by the control circuitry, the output signal via communicatively coupled wireless communication circuitry.

6. The method of claim 5, further comprising:

retrieving, by the control circuitry from communicatively coupled memory circuitry, one of:

data representative of the first message responsive to receipt of the first input;

data representative of the second message responsive to receipt of the second input; or data representative of the third message responsive to receipt of both the first input and the second input.

7. The method of claim 5, wherein receiving at least one of the first input or the second input further comprises:

receiving, by the control circuitry, at least one of:

the first input responsive to application of line voltage to a first terminal in the 3-way socket; or the second input responsive to application of line voltage to a second terminal in the 3-way socket.

8. The method of claim 5, wherein communicating the output signal via the wireless communication circuitry further comprises:

broadcasting, by the control circuitry, the output signal via the wireless communication circuitry.

9. A non-transitory, machine-readable, storage device that includes instructions that, when executed by control circuitry disposed in a housing that includes a base insertable in a 3-way socket, cause the control circuitry to:

receive at least one of:

a first input responsive to placement of the 3-way socket in a first state; or a second input responsive to placement of the 3-way socket in a second state;

generate an output signal that includes one of:

a first message responsive to receipt of the first input;

a second message responsive to receipt of the second input; or a third message responsive to receipt of both the first input and the second input; and communicate the output signal via communicatively coupled wireless communication circuitry.

10. The non-transitory, machine-readable, storage device of claim 9 wherein the instructions, when executed by the control circuitry, further cause the control circuitry to:

Retrieve, from communicatively coupled memory circuitry, one of:

data representative of the first message responsive to receipt of the first input;

data representative of the second message responsive to receipt of the second input; or data representative of the third message responsive to receipt of both the first input and the second input.

11. The non-transitory, machine-readable, storage device of claim 9 wherein the instructions that cause the control circuitry to receive at least one of the first input or the second input further cause the control circuitry to:

receive at least one of:

the first input responsive to application of line voltage to a first terminal in the 3-way socket; or the second input responsive to application of line voltage to a second terminal in the 3-way socket.

12. The non-transitory, machine-readable, storage device of claim 9 wherein the instructions that cause the control circuitry to communicate the output signal via the wireless communication circuitry further cause the control circuitry to:

broadcast the output signal via the wireless communication circuitry.

* * * * *